(12) United States Patent
Kang et al.

(10) Patent No.: US 10,681,543 B2
(45) Date of Patent: Jun. 9, 2020

(54) AGENT-BASED AUTHENTICATION AND KEY AGREEMENT METHOD FOR DEVICES WITHOUT SIM CARD

(71) Applicant: HUAWEI INTERNATIONAL PTE. LTD., Singapore (SG)

(72) Inventors: Xin Kang, Singapore (SG); Haiguang Wang, Singapore (SG); Jie Shi, Singapore (SG)

(73) Assignee: Huawei International Pte., Ltd., Singapore (SG)

( * ) Notice: Subject to any disclaimer, the term of this patent is extended or adjusted under 35 U.S.C. 154(b) by 0 days.

(21) Appl. No.: 16/132,946

(22) Filed: Sep. 17, 2018

(65) Prior Publication Data

US 2019/0021002 A1    Jan. 17, 2019

Related U.S. Application Data

(63) Continuation of application No. PCT/SG2017/050094, filed on Mar. 1, 2017.

(30) Foreign Application Priority Data

Mar. 18, 2016  (SG) .............. 10201602150

(51) Int. Cl.
*H04W 12/06* (2009.01)
*H04L 29/06* (2006.01)
(Continued)

(52) U.S. Cl.
CPC ........... *H04W 12/06* (2013.01); *H04L 9/0866* (2013.01); *H04L 9/0869* (2013.01);
(Continued)

(58) Field of Classification Search
CPC ....................................................... H04W 4/00
See application file for complete search history.

(56) References Cited

U.S. PATENT DOCUMENTS

| 8,689,297 | B2  |   | 4/2014 | Pasquero et al. |
|-----------|-----|---|--------|-----------------|
| 9,088,408 | B2  | * | 7/2015 | Campagna ............ H04L 9/0869 |

(Continued)

OTHER PUBLICATIONS

"PCR to FS_BEST_MTC_Sec: AKA procedures impact in very low throughput condition and on battery efficient batteries," 3GPP TSG SA WG3 (Security) Meeting #79, Nanjing, China, S3-151364, 3rd Generation Partnership Project, Valbonne, France (Apr. 20-24, 2015).

(Continued)

*Primary Examiner* — Ayaz R Sheikh
*Assistant Examiner* — Debebe A Asefa
(74) *Attorney, Agent, or Firm* — Leydig, Voit & Mayer, Ltd.

(57) ABSTRACT

A method for devices without SIM card (SD) to communicate directly with a core network. The method may be performed in the following matter. The SD registers with the core network through a cellular device (MD) in order to obtain a credential for the SD. The credential comprises Access ID, key, and control parameters. The SD then performs a mutual authentication directly with the core network using the credential. If the SD authenticates successfully with the core network, the SD is granted access to the servers via the core network.

18 Claims, 26 Drawing Sheets

(51) Int. Cl.

| | | |
|---|---|---|
| *H04W 76/10* | (2018.01) | |
| *H04L 9/08* | (2006.01) | |
| *H04W 8/04* | (2009.01) | |
| *H04W 12/04* | (2009.01) | |
| *H04W 4/70* | (2018.01) | |
| *H04W 8/02* | (2009.01) | |
| *H04W 88/04* | (2009.01) | |

(52) U.S. Cl.
CPC .......... *H04L 63/0869* (2013.01); *H04W 8/04* (2013.01); *H04W 12/04* (2013.01); *H04W 12/0608* (2019.01); *H04W 76/10* (2018.02); *H04W 4/70* (2018.02); *H04W 8/02* (2013.01); *H04W 88/04* (2013.01)

(56) References Cited

U.S. PATENT DOCUMENTS

| | | | |
|---|---|---|---|
| 2010/0177663 A1 | 7/2010 | Johansson et al. | |
| 2012/0115542 A1* | 5/2012 | Griffin | H04W 8/205 455/552.1 |
| 2013/0012168 A1 | 1/2013 | Rajadurai et al. | |
| 2013/0288644 A1 | 10/2013 | Schroeder et al. | |
| 2013/0305330 A1 | 11/2013 | Palanigounder | |
| 2016/0132851 A1* | 5/2016 | Desai | G06Q 20/202 705/21 |

OTHER PUBLICATIONS

"New Work Item on EGPRS Access Security Enhancements in relation to Cellular IoT," 3GPP TSG-SA WG3 Meeting #80,Tallinn, Estonia, S3-152087, 3rd Generation Partnership Project, Valbonne, France (Aug. 24-28, 2015).

"3rd Generation Partnership Project; Technical Specification Group Services and System Aspects; 3G Security; Security architecture (Release 13)," 3GPP TS 33.102 V13.0.0, pp. 1-76, 3rd Generation Partnership Project, Valbonne, France (Jan. 2016).

"3rd Generation Partnership Project; Technical Specification Group Services and System Aspects; 3GPP System Architecture Evolution (SAE); Security architecture(Release 13)," 3GPP TS 33.401 V13.2.0, pp. 1-146, 3rd Generation Partnership Project, Valbonne, France (Mar. 2016).

* cited by examiner

AGENT-BASED AUTHENTICATION AND KEY AGREEMENT METHOD FOR DEVICES WITHOUT SIM CARD

CROSS-REFERENCE TO RELATED APPLICATIONS

This application is a continuation of International Application No. PCT/SG2017/050094, filed on Mar. 1, 2017, which claims priority to Singapore Patent Application No. 10201602150Q, filed on Mar. 18, 2016. The disclosures of the aforementioned applications are hereby incorporated by reference in their entireties.

FIELD OF THE INVENTION

Embodiments of this invention relate to a method and system for granting devices without Subscriber Identity Module (SIM) card access to the core network. Particularly, embodiments of this invention relate to a method and system for registering devices without SIM card to the core network and subsequently accessing other servers via the core network.

SUMMARY OF THE PRIOR ART

In current 3G/4G cellular networks, mutual authentications are employed between User Equipment (UE) and networks, to protect mobile devices and networks from being eavesdropped or manipulated during data communication. The current mutual authentication protocol employed by 3G/4G is Authentication and Key Agreement (AKA). To perform AKA, the UE and the Core Network are required to have some pre-shared confidential information kept on both sides.

In 3G/4G networks, at the network side, the credentials are kept in servers named Home Subscriber Server (HSS); while at the UE side, the credentials are kept in an isolated device named Universal Subscriber Identity Module (USIM) card. The USIM card is a device embedded in a USIM slot inside a UE. USIM and UE can exchange information via a special interface. Currently, 3G/4G networks use symmetric keys in the mutual authentication. Hence, for a given International Mobile Subscriber Identification (IMSI), the credentials kept in the corresponding USIM and HSS are the same.

The cost of USIM is around 1 US dollar. This is acceptable for UE such as mobile phones. However, in future, most of the Internet of Thing (IoT) devices are low cost devices. The cost of USIM may be too much for this kind of devices. Thus, one skilled in the art strives to a method of connecting IoT devices to the Internet at a low cost.

When UE wants to access the network and transmits data, it has to do mutual authentication with the core network based on AKA. In the Evolved Packet System (EPS) AKA procedure, UE first sends an Attach Request to the Mobility Management Entity (MME). The MME forwards the Attach request to the HSS which subsequently generates one or multiple authentication vector based on the credentials shared with UE. The authentication vectors are sent to MME which subsequently sends authentication material to UE. The UE authenticates the network and then sends an authentication code to MME. The MME then verifies the authentication code and authenticates the UE. After authentication, UE exchanges key material with MME and eNB to further generate session keys for control and data plane.

It is important to note that this authentication scheme requires many rounds of interactions between the UE and the core network. This is acceptable for the current network with the current volume of mobile devices connected. However, with the increasing implementation of IoT devices, which is believed to reach 50 billion in 2020, the network overhead and the computing burden of the core network will be heavily stressed. Hence, there is a need to modify the current authentication scheme or implement a new authentication scheme.

SUMMARY OF THE INVENTION

The above and other problems are solved and an advance in the art is made by systems and methods provided by embodiments in accordance with the invention. A first advantage of embodiments of systems and methods in accordance with the invention is that IoT devices having no SIM card can access the core network directly. Inevitably, this reduces the cost of equipping IoT devices with SIM card. A second advantage of embodiments of systems and methods in accordance with the invention is that the authentication process is improved as the number of interactions is required between the IoT devices and core network is substantially reduced.

The above advantages are provided by embodiments of a system and a method for devices without SIM card (SD) to communicate directly with a core network in accordance with the invention operating in the following manner.

According to a first aspect of the invention, a method for a cellular device (MD) for registering devices without SIM card (SD) to communicate directly with a core network comprising:
receiving a Device ID from the SD; generating an Access ID and key (Ki) for the SD;
transmitting the Access ID and Ki to the SD.

With reference to the first aspect, in a first possible implementation manner of the first aspect, wherein before the receiving a Device ID from the SD, the mothed further comprises:
establishing a first security channel between the SD and the MD; transmitting a request to the SD for an identity information of the SD (Device ID); wherein the receiving a Device ID from the SD comprises: receiving the Device ID from the SD within the first security channel; wherein after the generating an Access ID and key (Ki) for the SD, the mothed further comprises: creating a new entry; appending the new entry to include the Access ID and Ki.

With reference to the first aspect or the first possible implementation manner of the first aspect, in a second possible implementation manner of the first aspect, wherein the generating the Access ID for the SD comprises: combining the MD's identity with Device ID to obtain the Access ID.

With reference to the first aspect or the first possible implementation manner of the first aspect, in a third possible implementation manner of the first aspect, wherein the generating the Access ID for the SD comprises: combining the MD's identity with a random number to obtain the Access ID.

With reference to the first aspect or the first possible implementation manner of the first aspect, in a fourth possible implementation manner of the first aspect, wherein the generating the Access ID for the SD comprises: combining a sequence number assigned to MD with the Device ID to obtain the Access ID.

With reference to anyone of the above possible implementation manner of the first aspect, in a fifth possible implementation manner of the first aspect, wherein the generating the key (Ki) for the SD comprises: generate Ki using a Key Derivation Function (KDF) with input parameter being one or more of MD's identity, Device ID and Access ID.

With reference to the first aspect, in a sixth possible implementation manner of the first aspect, wherein the generating the Access ID and key (Ki) for the SD comprises: transmitting the Device ID to the core network; and receiving the Access ID and Ki from the core network.

With reference to the sixth possible implementation manner of the first aspect, in a seventh possible implementation manner of the first aspect, wherein before the transmitting the Device ID to the core network, the method further comprises: establishing a second security channel between the SD and the core network; wherein the transmitting the Device ID to the core network comprises: transmitting the Device ID to the core network upon establishing the second security channel.

According to a second aspect of the invention, a method for communicating a device without SIM card (SD) with a core network comprising: registering with the core network through a cellular device (MD) to obtain a credential for the SD, the credential comprises an Access ID and a key (Ki); performing a mutual authentication directly with the core network using the Access ID and Ki; and accessing servers via the core network in response to authenticating successfully with the core network.

With reference to the second aspect, in a first possible implementation manner of the second aspect, wherein the registering with the core network through the MD comprises: retrieving the Device ID; transmitting the Device ID to the MD; receiving the Access ID and Ki from the MD; and storing the Access ID and Ki.

With reference to the second aspect or the first possible implementation manner of the second aspect, in a second possible implementation manner of the second aspect, wherein the performing the mutual authentication directly with the core network using the credential comprises: sending an Attach Request to the core network, the Attach Request comprising the Access ID; receiving a User Authentication Request from the core network, the User Authentication Request comprising a random number (RAND) and an authentication token (AUTNHSS) generated by the core network using Evolved Packet System (EPS) Authentication and Key Agreement (AKA) algorithm; computing an authentication vector using EPS AKA algorithm with the RAND, the Ki, a serving network identity (SN ID), a sequence number (SQN) as the input parameters and an authentication token (AUTNUE) and a response parameter (RES) as the output parameter; determining whether the AUTNUE is equal to the AUTNHSS; and generating and transmit a User Authentication Response message to the MME in response to the AUTNUE being equal to AUTNHSS, the User Authentication Response comprising RES.

With reference to the second aspect or the first possible implementation manner of the second aspect, in a third possible implementation manner of the second aspect, wherein the performing the mutual authentication directly with the core network using the credential comprises: determining a new key (K1i) using a Key Derivation Function (KDF) with input as Ki and a random number (RAND 1); generating a Message Authentication Code for Integrity 1 (MAC 1) using K1i with input parameters comprising Access ID, RAND 1, and Fresh Parameter 1; generating and transmit an Attach Request to the core network, the Attach Request comprising the Access ID, RAND 1, Fresh Parameter 1, and MAC 1; receiving an Authentication Success message from the core network, the Authentication Success message includes a one-bit sign (AuthSuccess), a random number (RAND 2) generated by the core network, Fresh Parameter 2, and MAC 2, wherein MAC 2 is generated by the core network using another key (K2i) with AuthSuccess, RAND 2 and Fresh Parameter 2 as input parameters, wherein the Fresh Parameters 1 and 2 are one of a timestamp, counter and sequence number; determining another key (K2i) using KDF with Ki, RAND 1, and RAND 2 as input parameters; determining a validity of MAC 2 using K2i; and transmitting and receiving data with the core network in response to MAC 2 being valid.

With reference to the second aspect or the first possible implementation manner of the second aspect, in a fourth possible implementation manner of the second aspect, wherein the performing the mutual authentication directly with the core network using the credential comprises: generating a Message Authentication Code for Integrity 1 (MAC 1) using Ki with input parameters comprising Access ID and Fresh Parameter 1; generating and transmitting an Attach Request to the core network, the Attach Request comprising the Access ID, Fresh Parameter 1, and MAC 1, wherein the Fresh Parameter 1 is one of a timestamp, counter and sequence number; receiving an Authentication Success message from the core network, the Authentication Success message includes a one-bit sign (AuthSuccess), Fresh Parameter 2, and MAC 2; determining a validity of MAC 2 using Ki; and transmitting and receiving data with the core network in response to MAC 2 being valid.

According to a third aspect of the invention, a cellular device (MD) for registering devices without SIM card (SD) to communicate directly with a core network comprising: a processor; a storage medium; instructions stored on the storage medium and executable by the processor to: receive a Device ID from the SD; generate an Access ID and key (Ki) for the SD; transmit the Access ID and Ki to the SD.

With reference to the third aspect, in a first possible implementation manner of the third aspect, wherein before the receiving a Device ID from the SD, wherein the instructions stored on the storage medium and executable by the processor to: establish a first security channel between the SD and the MD; transmit a request to the SD for an identity information of the SD (Device ID); wherein the instruction to receiving Device ID from the SD comprises instructions to: receive the Device ID from the SD within the first security channel; wherein after the generating an Access ID and key (Ki) for the SD, the instructions stored on the storage medium and executable by the processor to: create a new entry; append the new entry to include the Access ID and Ki.

With reference to the third aspect or the first possible implementation manner of the third aspect, in a second possible implementation manner of the third aspect, wherein the instructions to generate the Access ID for the SD comprises instructions to: combine the MD's identity with Device ID to obtain the Access ID.

With reference to the third aspect or the first possible implementation manner of the third aspect, in a third possible implementation manner of the third aspect, wherein the instruction to generate the Access ID for the SD comprises instructions to: combining the MD's identity with a random number to obtain the Access ID.

With reference to the third aspect or the first possible implementation manner of the third aspect, in a fourth possible implementation manner of the third aspect, wherein the instruction to generate the Access ID for the SD comprises instructions to: combine a sequence number assigned to MD with the Device ID to obtain the Access ID.

With reference to any of the above possible implementation manner of the third aspect, in a fifth possible implementation manner of the third aspect, wherein the instruction to generate the key (Ki) for the SD comprises instructions to: generate Ki using a Key Derivation Function (KDF) with input parameter being one or more of MD's identity, Device ID and Access ID.

With reference to the third aspect, in a sixth possible implementation manner of the third aspect, wherein the generating the Access ID and key (Ki) for the SD comprises:

transmitting the Device ID to the core network; and receiving the Access ID and Ki from the core network.

With reference to the sixth possible implementation manner of the third aspect, in a seventh possible implementation manner of the third aspect, wherein before the transmitting the Device ID to the core network, instructions stored on the storage medium and executable by the processor to: establish a second security channel between the SD and the core network; wherein the instruction to transmit the Device ID to the core network comprises instructions to: transmit the Device ID to the core network upon establishing the second security channel.

According to a fourth aspect of the invention, a device without SIM card (SD) for communicating with a core network comprising: a processor; a storage medium; instructions stored on the storage medium and executable by the processor to: register with the core network through a cellular device (MD) to obtain a credential for the SD, the credential comprises an Access ID and a key (Ki); perform a mutual authentication directly with the core network using the Access ID and Ki; and access servers via the core network in response to authenticating successfully with the core network.

With reference to the fourth aspect, in a first possible implementation manner of the fourth aspect, wherein the instruction to register with the core network through the MD comprises instructions to: retrieve the Device ID; transmit the Device ID to the MD; receive the Access ID and Ki from the MD; and store the Access ID and Ki in the storage medium.

With reference to the fourth aspect or the first possible implementation manner of the fourth aspect, in a second possible implementation manner of the fourth aspect, wherein the instruction performing the mutual authentication directly with the core network using the credential comprises instructions to: send an Attach Request to the core network, the Attach Request comprising the Access ID; receive a User Authentication Request from the core network, the User Authentication Request comprising a random number (RAND) and an authentication token (AUTNHSS) generated by the core network using Evolved Packet System (EPS) Authentication and Key Agreement (AKA) algorithm; compute an authentication vector using EPS AKA algorithm with the RAND, the Ki, a serving network identity (SN ID), a sequence number (SQN) as the input parameters and an authentication token (AUTNUE) and a response parameter (RES) as the output parameter; determine whether the AUTNUE is equal to the AUTNHSS; and generate and transmit a User Authentication Response message to the MME in response to the AUTNUE being equal to AUTNHSS, the User Authentication Response comprising RES.

With reference to the fourth aspect or the first possible implementation manner of the fourth aspect, in a third possible implementation manner of the fourth aspect, wherein the instruction performing the mutual authentication directly with the core network using the credential comprises instructions to: determine a new key (K1i) using a Key Derivation Function (KDF) with input as Ki and a random number (RAND 1); generate a Message Authentication Code for Integrity 1 (MAC 1) using K1i with input parameters comprising Access ID, RAND 1, and Fresh Parameter 1; generate and transmit an Attach Request to the core network, the Attach Request comprising the Access ID, RAND 1, Fresh Parameter 1, and MAC 1; receive an Authentication Success message from the core network, the Authentication Success message includes a one-bit sign (AuthSuccess), a random number (RAND 2) generated by the core network, Fresh Parameter 2, and MAC 2, wherein MAC 2 is generated by the core network using another key (K2i) with AuthSuccess, RAND 2 and Fresh Parameter 2 as input parameters, wherein the Fresh Parameters 1 and 2 are one of a timestamp, counter and sequence number; determine another key (K2i) using KDF with Ki, RAND 1, and RAND 2 as input parameters; determine a validity of MAC 2 using K2i; and transmit and receive data with the core network in response to MAC 2 being valid.

With reference to the fourth aspect or the first possible implementation manner of the fourth aspect, in a fourth possible implementation manner of the fourth aspect, wherein the instruction performing the mutual authentication directly with the core network using the credential comprises instructions to: generate a Message Authentication Code for Integrity 1 (MAC 1) using Ki with input parameters comprising Access ID and Fresh Parameter 1; generate and transmit an Attach Request to the core network, the Attach Request comprising the Access ID, Fresh Parameter 1, and MAC 1, wherein the Fresh Parameter 1 is one of a timestamp, counter and sequence number; receive an Authentication Success message from the core network, the Authentication Success message includes a one-bit sign (AuthSuccess), Fresh Parameter 2, and MAC 2; determine a validity of MAC 2 using Ki; and transmit and receive data with the core network in response to MAC 2 being valid.

According to a fifth aspect of the invention, a core network for registering devices without SIM card (SD) to communicate directly with the core network comprising: a Mobility Management Entity (MME) and a Home Subscriber Server (HSS) communicatively connected together, each of the MME and HSS comprising a processor, a storage medium, and instructions stored on the respective storage medium and executable by the respective processor to: register an SD through a cellular device (MD) to obtain a credential for the SD, the credential comprises an Access ID and a key (Ki); perform a mutual authentication directly with the SD using the Access ID and key; and grant the SD access to servers in response to authenticating successfully with the SD.

With reference to the fifth aspect, in a first possible implementation manner of the fifth aspect, wherein the instructions to register the SD through the MD comprise instructions stored on the storage medium of the MME to: establish a security channel between the MD and the MME; receive and review a message from the MD within the security channel; generate data based on the message received; transmit the data to the HSS; receive a response message from the HSS; and transmit the response message to the MD within the security channel.

With reference to the first possible implementation manner of the fifth aspect, in a second possible implementation manner of the fifth aspect, wherein the data comprises an identity of the MD (MD ID), Device ID and control parameter to the HSS in response to the message containing a Device ID and control parameter, wherein MD ID is obtainable via the message received from the MD.

With reference to the first possible implementation manner of the fifth aspect, in a third possible implementation manner of the fifth aspect, wherein the data comprises an identity of the MD (MD ID), Device ID, Access ID, key and control parameter to the HSS in response to the message containing a Device ID, Access ID, key and control parameter, wherein MD ID is obtainable via the message received from the MD.

With reference to the second or third possible implementation manner of the fifth aspect, in a fourth possible implementation manner of the fifth aspect, wherein the instructions to register the SD through the MD comprise instructions stored on the storage medium of the HSS to: receive the data from the MME; determine whether the data contains an Access ID; generate a Access ID and Ki in response to the data not containing an Access ID; and store the Access ID and Ki from the data in the storage medium of the HSS in response to the data containing an Access ID.

With reference to the fourth possible implementation manner of the fifth aspect, in a fifth possible implementation manner of the fifth aspect, wherein the instruction to generate Access ID and Ki comprises instructions stored on the storage medium of the HSS to: retrieve a record for a list of MDs from the storage medium; determine whether the Device ID is in the list of MDs; create a new entry in the list of MDs in response to determining the Device ID is not in the list of MDs; generate the Access ID by combining the MD ID and Device ID; and generate the Ki by using a Key Derivation Function (KDF) on one or a few of MD ID and Device ID; append the new entry to include Access ID, key, and control parameter; and generate and transmit a response message containing the generated Access ID and key for the Device ID to the MME.

With reference to the fourth possible implementation manner of the fifth aspect, in a sixth possible implementation manner of the fifth aspect, wherein the instruction to store the Access ID and Ki comprises instructions stored on the storage medium of the HSS to: determine whether the Access ID is acceptable; create a new entry in a list of MDs in the HSS database comprising the Device ID, Access ID, Key and control parameter in response to the Access ID being acceptable; and generate and transmit a response message containing an acceptance message to the MME.

With reference to the sixth possible implementation manner of the fifth aspect, in a seventh possible implementation manner of the fifth aspect, wherein the instruction to determine whether the Access ID is acceptable comprises instruction to: verify whether a format of the Access ID is in a pre-determined format.

With reference to the fifth aspect, in a eighth possible implementation manner of the fifth aspect, wherein the instructions to perform a mutual authentication directly with the SD using the Access ID and key comprise instructions stored on the storage medium of the MME to: receive an Attach Request from the SD, the Attach Request comprising the Access ID; generate an Authentication Data Request based on the Attach Request received; transmit the Authentication Data Request to the HSS, wherein the Authentication Data Request comprises Access ID, Serving Network Identity (SN ID) and network type, and wherein the SN ID and network type are obtainable on the Attach Request received from the SD.

With reference to the eighth possible implementation manner of the fifth aspect, in a ninth possible implementation manner of the fifth aspect, wherein the instructions to perform a mutual authentication directly with the SD using the Access ID and key comprise instructions stored on the storage medium of the HSS to: receive the Authentication Data Request from the MME; compute a plurality of first authentication vectors based on Evolved Packet System (EPS) Authentication and Key Agreement (AKA) algorithm with a random number (RAND), Key, SN ID, SQN as the input parameters and AUTNHSS, XRES, and KASME as the output parameter; and generate and transmit an Authentication Data Response comprising the plurality of first authentication vectors, each first authentication vector comprises RAND, AUTNHSS, XRES, KASME.

With reference to the ninth possible implementation manner of the fifth aspect, in a tenth possible implementation manner of the fifth aspect, wherein the instructions to perform a mutual authentication directly with the SD using the Access ID and key comprise instructions stored on the storage medium of the MME to: receive the Authentication Data Response from the HSS; select one of the plurality of first authentication vectors; generate and transmit a User Authentication Request to the SD, the User Authentication Request comprising the RAND and the AUTNHSS from the selected first authentication vector; receive a User Authentication Response message from the SD, the User Authentication Response comprising a response parameter (RES) generated by the SD using EPS AKA algorithm; determine whether RES is equal to XRES received from HSS in response to receiving the User Authentication Response from the SD; and grant SD access to gateways in response to RES being equal to XRES.

With reference to the fifth aspect, in a eleventh possible implementation manner of the fifth aspect, wherein the instructions to perform a mutual authentication directly with the SD using the Access ID and key comprise instructions stored on the storage medium of the MME to:

receive an Attach Request from the SD, the Attach Request comprising the Access ID, a random number (RAND 1), Fresh Parameter 1, and a Message Authentication Code for Integrity 1 (MAC 1), wherein the Fresh Parameter 1 is one of a timestamp, counter and sequence number; determine a validity of the Attach Request in response to receiving the Attach Request from the SD; and generate and transmit an Authentication Data Request to the HSS in response to determining the Attach Request is valid, the Authentication Data Request includes the Access ID and RAND 1.

With reference to the eleventh possible implementation manner of the fifth aspect, in a twelfth possible implementation manner of the fifth aspect, wherein the instruction to determine the validity of the Attach Request comprises instruction to: determine whether the timestamp for the Attach Request is within a pre-determined time range.

With reference to the eleventh possible implementation manner of the fifth aspect, in a thirteenth possible implementation manner of the fifth aspect, wherein the instruction to determine the validity of the Attach Request comprises instruction to: determine whether the counter is in running order with respect to previous Attach Request.

With reference to the eleventh possible implementation manner of the fifth aspect, in a fourteenth possible implementation manner of the fifth aspect, wherein the instruction to determine the validity of the Attach Request comprises instruction to: determine whether the number of the Attach Request is in accordance with a pre-determined sequence with respect to the number in the previous Attach Request.

With reference to the eleventh possible implementation manner of the fifth aspect, in a fifteenth possible implementation manner of the fifth aspect, wherein the instructions to perform a mutual authentication directly with the SD using the Access ID and key comprise instructions stored on the storage medium of the HSS to: receive the Authentication Data Request from the MME; retrieve the Ki that corresponds to the Access ID from the storage medium; determine a new key K1i using the KDF with Ki and RAND 1; generate another random number (RAND 2); determine another key (K2i) using the KDF with Ki, RAND 1, and RAND 2; and generate and transmit an Authentication Data Response to the MME, the Authentication Data Response comprises K1i, K2i, and RAND 2.

With reference to the fifteenth possible implementation manner of the fifth aspect, in a sixteenth possible implementation manner of the fifth aspect, wherein the instructions to perform a mutual authentication directly with the SD using the Access ID and key comprise instructions stored on the storage medium of the MME to: receive the Authentication Data Response from the HSS; determine a validity of MAC 1 using K1i; compute a Message Authentication Code for Integrity 2 (MAC 2) using K2i with a one-bit sign (AuthSuccess), RAND 2 and Fresh Parameter 2 as input parameters in response to MAC 1 being valid; generate and transmit an Authentication Success message to SD, the Authentication Success message includes AuthSuccess, RAND 2, Fresh Parameter 2, and MAC 2; and transmit a message to gateways to grant access to the SD.

With reference to the fifth aspect, in a seventeenth possible implementation manner of the fifth aspect, wherein the instructions to perform a mutual authentication directly with the SD using the Access ID and key comprise instructions stored on the storage medium of the MME to: receive an Attach Request from the SD, the Attach Request comprising the Access ID, Fresh Parameter 1, and a Message Authentication Code for Integrity 1 (MAC 1), wherein the Fresh Parameter 1 is one of a timestamp, counter and sequence number; determine a validity of the Attach Request in response to receiving the Attach Request from the SD; and generate and transmit an Authentication Data Request to the HSS in response to determining the Attach Request is valid, the Authentication Data Request includes the Access ID.

With reference to the seventeenth possible implementation manner of the fifth aspect, in a eighteenth possible implementation manner of the fifth aspect, wherein the instructions to perform a mutual authentication directly with the SD using the Access ID and key comprise instructions stored on the storage medium of the HSS to: receive the Authentication Data Request from the MME; retrieve the Key that corresponds to the Access ID from the storage medium; generate and transmit an Authentication Data Response to the MME, the Authentication Data Response comprises the Key.

With reference to the eighteenth possible implementation manner of the fifth aspect, in a nineteenth possible implementation manner of the fifth aspect, wherein the instructions to perform a mutual authentication directly with the SD using the Access ID and key comprise instructions stored on the storage medium of the MME to: receive the Authentication Data Response from the HSS; determine a validity of MAC 1 using the Key; compute a Message Authentication Code for Integrity 2 (MAC 2) using the key with a one-bit sign (AuthSuccess), and Fresh Parameter 2 as input parameters in response to MAC 1 being valid; generate and transmit an Authentication Success message to SD, the Authentication Success message includes AuthSuccess, Fresh Parameter 2, and MAC 2; and transmit a message to gateways to grant access to the SD.

According to a sixth aspect of the invention, a Home Subscriber Server (HSS) for registering devices without SIM card (SD) to communicate directly with the core network comprising: a processor, a storage medium, and instructions stored on the storage medium and executable by the processor to: receive the data from the MME; determine whether the data contains an Access ID; generate an Access ID and Ki in response to the data not containing an Access ID.

With reference to the sixth aspect, in a first possible implementation manner of the sixth aspect, wherein the instruction to generate a Access ID and Ki comprises instructions stored on the storage medium of the HSS to: retrieve a record for a list of MDs from the storage medium; determine whether the Device ID is in the list of MDs; create a new entry in the list of MDs in response to determining the Device ID is not in the list of MDs; generate the Access ID by combining the MD ID and Device ID; and generate the Ki by using a Key Derivation Function (KDF) on one or a few of MD ID and Device ID; append the new entry to include Access ID, key, and control parameter; and generate and transmit a response message containing the generated Access ID and key for the Device ID to the MME.

With reference to the sixth aspect or the first possible implementation manner of the sixth aspect, in a second possible implementation manner of the sixth aspect, wherein the instructions stored on the storage medium and executable by the processor to: store the Access ID and Ki from the data in the storage medium of the HSS in response to the data containing an Access ID.

With reference to the second possible implementation manner of the sixth aspect, in a third possible implementation manner of the sixth aspect, wherein the instruction to store the Access ID and Ki comprises instructions stored on the storage medium of the HSS to: determine whether the Access ID is acceptable; create a new entry in a list of MDs in the HSS database comprising the Device ID, Access ID, Key and control parameter in response to the Access ID being acceptable; and generate and transmit a response message containing an acceptance message to the MME.

According to a seventh aspect of the invention, a Home Subscriber Server (HSS) for registering devices without SIM card (SD) to communicate directly with the core network comprising:

a processor, a storage medium, and instructions stored on the storage medium and executable by the processor to: receive an Authentication Data from the HSS, wherein the Authentication Data includes a RAND and a AUTNHSS; generate and transmit a User Authentication Request to the SD, the User Authentication Request comprising the RAND and the AUTNHSS; receive a User Authentication Response message from the SD, the User Authentication Response comprising a response parameter (RES) generated by the SD using EPS AKA algorithm; determine whether RES is equal to XRES received from HSS in response to receiving the User Authentication Response from the SD; and grant SD access to gateways in response to RES being equal to XRES.

According to an eighth aspect of the invention, a cellular device (MD) for registering devices without SIM card (SD) to communicate directly with a core network comprising: receiving unit, configured to receive a Device ID from the SD; generation unit, configured to generate an Access ID and key (Ki) for the SD; transmitting unit, configured to transmit the Access ID and Ki to the SD.

With reference to the eighth aspect, in a first possible implementation manner of the eighth aspect, wherein the MD comprises first connection unit and adding unit; the first connection unit, configured to establish a first security channel between the SD and the MD; the transmitting unit, configured to transmit a request to the SD for an identity information of the SD (Device ID); wherein the instruction to receiving Device ID from the SD comprises instructions to: the receiving unit, configured to receive the Device ID from the SD within the first security channel; the adding unit, configured to create a new entry; and append the new entry to include the Access ID and Ki.

With reference to the eighth aspect or the first possible implementation manner of the eighth aspect, in a second possible implementation manner of the eighth aspect, wherein the generating unit is configured to: combine the MD's identity with Device ID to obtain the Access ID.

With reference to the eighth aspect or the first possible implementation manner of the eighth aspect, in a third possible implementation manner of the eighth aspect, wherein the generating unit is configured to: combining the MD's identity with a random number to obtain the Access ID.

With reference to the eighth aspect or the first possible implementation manner of the eighth aspect, in a fourth possible implementation manner of the eighth aspect, wherein the generating unit is configured to: combine a sequence number assigned to MD with the Device ID to obtain the Access ID.

With reference to any of the above possible implementation manner of the eighth aspect, in a fifth possible implementation manner of the eighth aspect, wherein the generating unit is configured to: generate Ki using a Key Derivation Function (KDF) with input parameter being one or more of MD's identity, Device ID and Access ID.

With reference to the eighth aspect, in a sixth possible implementation manner of the eighth aspect, wherein the generating unit is configured to: transmit the Device ID to the core network; and receive the Access ID and Ki from the core network.

With reference to the sixth possible implementation manner of the eighth aspect, in a seventh possible implementation manner of the eighth aspect, wherein the MD comprises a second connection unit; the second connection unit, configured to establish a second security channel between the SD and the core network; the transmitting unit, configured to transmit the Device ID to the core network upon establishing the second security channel.

According to a ninth aspect of the invention, a device without SIM card (SD) for communicating with a core network comprising: registering unit, configured to register with the core network through a cellular device (MD) to obtain a credential for the SD, the credential comprises an Access ID and a key (Ki); authentication unit, configured to perform a mutual authentication directly with the core network using the Access ID and Ki; and accessing unit, configured to access servers via the core network in response to authenticating successfully with the core network.

With reference to the ninth aspect, in a first possible implementation manner of the ninth aspect, wherein the registering unit is configured to: retrieve the Device ID; transmit the Device ID to the MD; receive the Access ID and Ki from the MD; and store the Access ID and Ki in the storage medium.

With reference to the ninth aspect or the first possible implementation manner of the ninth aspect, in a second possible implementation manner of the ninth aspect, wherein the authentication unit is configured to: send an Attach Request to the core network, the Attach Request comprising the Access ID; receive a User Authentication Request from the core network, the User Authentication Request comprising a random number (RAND) and an authentication token (AUTNHSS) generated by the core network using Evolved Packet System (EPS) Authentication and Key Agreement (AKA) algorithm; compute an authentication vector using EPS AKA algorithm with the RAND, the Ki, a serving network identity (SN ID), a sequence number (SQN) as the input parameters and an authentication token (AUTNUE) and a response parameter (RES) as the output parameter; determine whether the AUTNUE is equal to the AUTNHSS; and generate and transmit a User Authentication Response message to the MME in response to the AUTNUE being equal to AUTNHSS, the User Authentication Response comprising RES.

With reference to the ninth aspect or the first possible implementation manner of the ninth aspect, in a third possible implementation manner of the ninth aspect, wherein the authentication unit is configured to: determine a new key (K1i) using a Key Derivation Function (KDF) with input as Ki and a random number (RAND 1); generate a Message Authentication Code for Integrity 1 (MAC 1) using K1i with input parameters comprising Access ID, RAND 1, and Fresh Parameter 1; generate and transmit an Attach Request to the core network, the Attach Request comprising the Access ID, RAND 1, Fresh Parameter 1, and MAC 1; receive an Authentication Success message from the core network, the Authentication Success message includes a one-bit sign (AuthSuccess), a random number (RAND 2) generated by the core network, Fresh Parameter 2, and MAC 2, wherein MAC 2 is generated by the core network using another key (K2i) with AuthSuccess, RAND 2 and Fresh Parameter 2 as input parameters, wherein the Fresh Parameters 1 and 2 are one of a timestamp, counter and sequence number; determine another key (K2i) using KDF with Ki, RAND 1, and RAND 2 as input parameters; determine a validity of MAC 2 using K2i; and transmit and receive data with the core network in response to MAC 2 being valid.

With reference to the ninth aspect or the first possible implementation manner of the ninth aspect, in a fourth possible implementation manner of the ninth aspect, wherein the authentication unit is configured to: generate a Message Authentication Code for Integrity 1 (MAC 1) using Ki with input parameters comprising Access ID and Fresh Parameter 1; generate and transmit an Attach Request to the core network, the Attach Request comprising the Access ID, Fresh Parameter 1, and MAC 1, wherein the Fresh Parameter 1 is one of a timestamp, counter and sequence number; receive an Authentication Success message from the core network, the Authentication Success message includes a one-bit sign (AuthSuccess), Fresh Parameter 2, and MAC 2; determine a validity of MAC 2 using Ki; and transmit and receive data with the core network in response to MAC 2 being valid.

BRIEF DESCRIPTION OF THE DRAWINGS

The above advantages and features in accordance with embodiments of this invention are described in the following detailed description and are shown in the following drawings.

DETAILED DESCRIPTION

Embodiments relate to a method and system for granting devices without Subscriber Identity Module (SIM) card access to the core network. Particularly, embodiments relate to a method and system for registering devices without SIM card to the core network and subsequently accessing other servers via the core network.

It is envisioned that embodiments of this invention provide an authentication scheme for future low lost cellular devices without SIM card such as Internet of Things (IoT). The current mutual authentication schemes (such as AKA and GBA) between a UE and the core network is based on the pre-shared key stored in the UE's SIM card and the HSS. For a wireless device without SIM card such as IoTs, the current authentication schemes (such as AKA and GBA) cannot be applied.

Current authentication schemes need many rounds of interactions between the UE and the core network. This overly burdens the core network. Thus, one skilled in the art strives to reduce the number of interactions needed for the mutual authentication between the UE and the core network.

Figure 1:
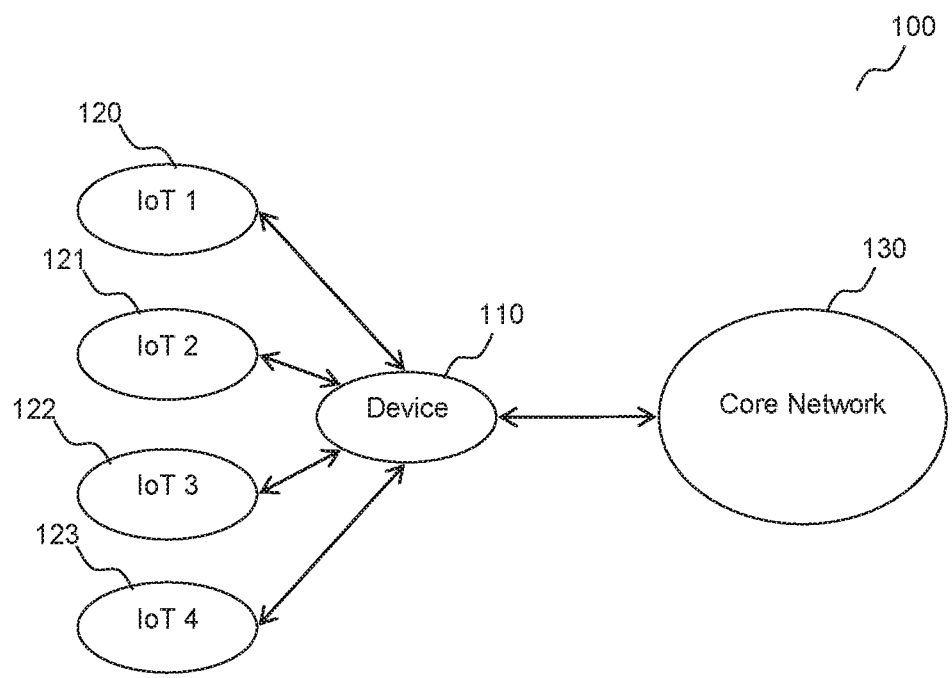
FIG. 1 illustrating a simplified network infrastructure in accordance with an embodiment of this disclosure.

FIG. 1 illustrates a simplified network infrastructure 100. Particularly, the network infrastructure 100 shows a wireless cellular device 110 with SIM card acting as a bridge to build up connection between the IoT devices 120-123 without SIM card and the Core Network 130. One skilled in the art will recognize that between cellular device 110 and core network 130, other system such as base stations to connect the device 110 to the core network 130 are required. Hence, FIG. 1 is not meant to be exhaustive and merely for illustrative purposes only.

Figure 2:
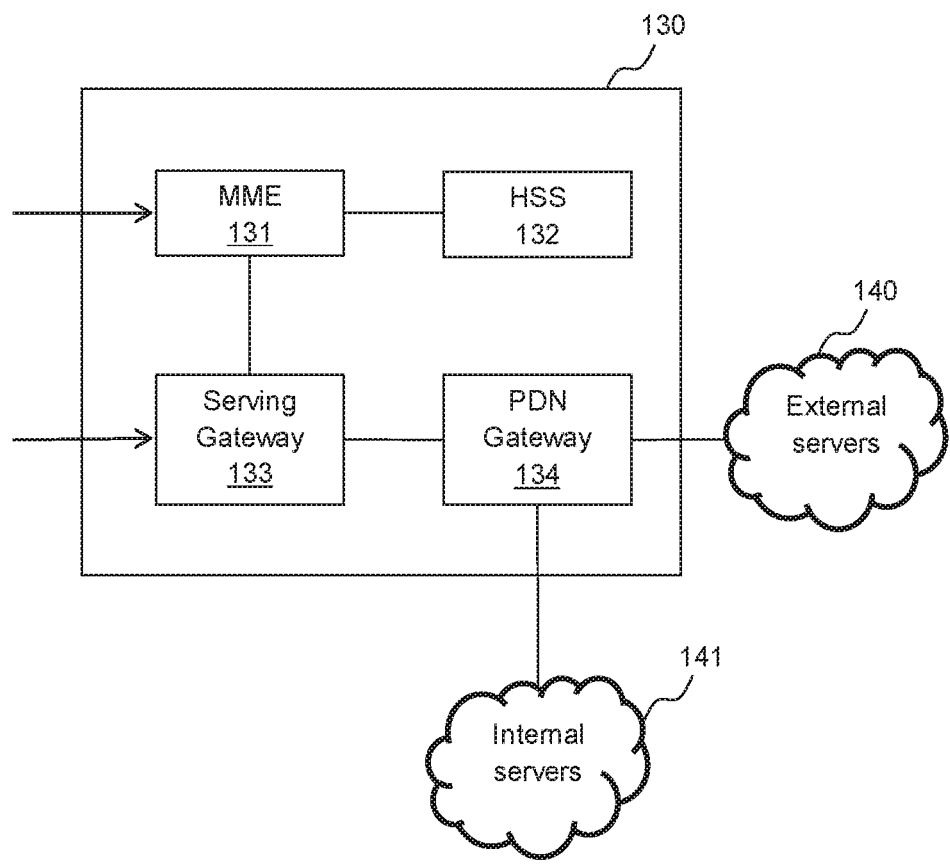
FIG. 2 illustrating a simplified block diagram of a core network in accordance with an embodiment of this disclosure.

FIG. 2 illustrates a simplified block diagram of a core network 130. The Home Subscriber Server (HSS) 132 is a central database containing information such as Access ID and Key of the network operator's subscribers. The Mobility Management Entity (MME) 131 controls high level operations. One of the operations includes authenticating the user by interacting with the HSS. The Serving Gateway 133 routes and forwards user data packets between cellular device 110 and PDN Gateway 134. The PDN Gateway 134 communicates with the external servers 140 internal servers 141. Internal servers 141 are owned by the operator of the core network while external servers are owned by other operators. In order for a cellular device 110 to communicate with other devices via the external or internal servers 140 and 141, it has to authenticate with the MME 131. The MME 131 interacts with the HSS 132 and authenticate with the cellular device 110. If authentication is successful, the MME 131 would grant the cellular device 110 access to the external or internal servers 140 and 141 via the Serving Gateway and PDN Gateway. In short, before a cellular device 110 can connect to the internet with a core network 130, the cellular device 110 must be a registered user with Access ID and Key stored on the HSS 132 in order to correctly authenticate with the MME so that MME would grant the cellular device 110 access to the respective gateways.

In the current network arrangement, a cellular device 110 is allocated an Access Identification and a Key (K) for authenticating with the core network 130. IoT devices 120-123 without the SIM card, they are not able to communicate directly with the core network 130. This is because the cellular device 110 authenticates the core network based on its IMSI and a pre-shared key which are stored in a SIM card.

For purposes of this disclosure, the cellular device 110 with SIM card is referred to as the Master Device (MD), and the IoT devices 120-123 without SIM card are referred to as the Secondary Devices (SDs). Further, the term "Internet of Things" (IoT) devices refer to any apparatus having a communication interface to allow transferring and receiving of information among the IoT devices over a wired or wireless connection. IoT devices comprise, but not limited to, sensor devices, embedded systems, network-based cameras, gateways, mobile phones, computers, laptops, personal digital assistants (PDAs), white goods, appliances, etc.

For embedded systems, gateways, mobile phones, computers, laptops, and PDAs, such IoT devices are typically equipped with wireless network interface (e.g. Bluetooth, Wi-Fi, Wi-Fi Direct, Long-Term Evolution (LTE) Direct, RF antenna, etc.) or wired network interface (e.g. an Ethernet connection, a USB or Firewire connection, etc.) to allow transferring and receiving of data.

Figure 3:
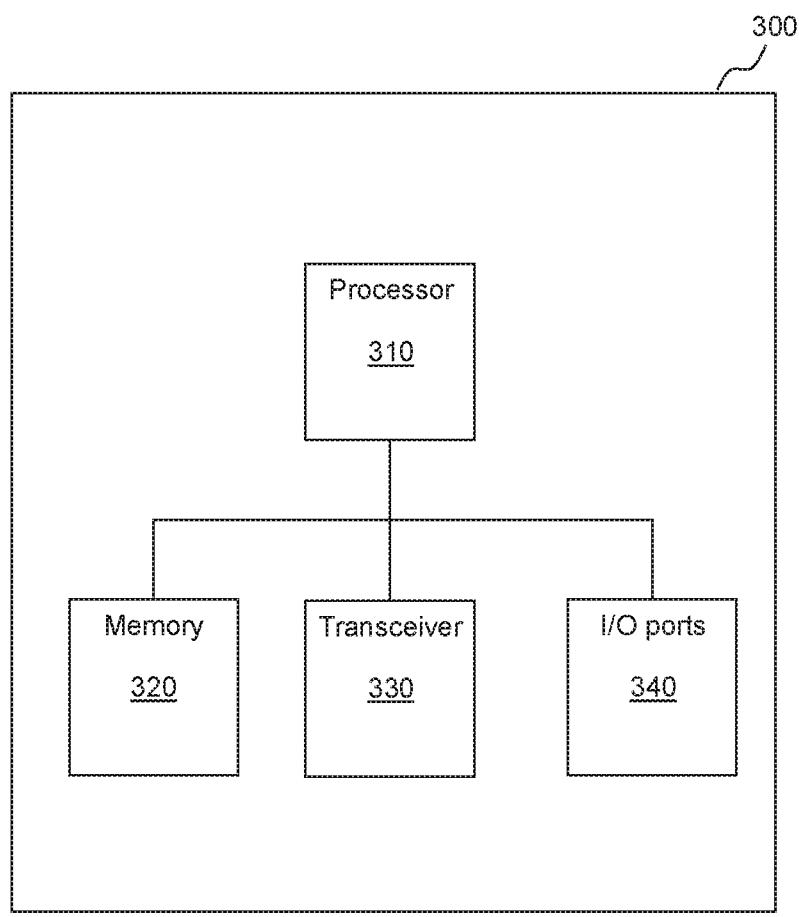
FIG. 3 illustrating a block diagram of a basic network interface in accordance with an embodiment of this disclosure.

For white goods such as fridge and washing machine, such appliances may not be equipped with any wired or wireless network interface. Hence, it is common that a network interface module be provided to allow such appliances to be communicatively connected to the mobile device 110 so that these IoT devices can communicate with the core network 130. FIG. 3 illustrates the block diagram of a basic network interface 300. The network interface 300 can receive and transmit data, execute software applications. Network interface 200 comprises a processor 310, memory 320, transceiver 330 and input/output ports 340.

The processor 310 is a processor, microprocessor, microcontroller, application specific integrated circuit, digital signal processor (DSP), programmable logic circuit, or other data processing device that executes instructions to perform the processes in accordance with embodiments of the present invention. The processor 310 has the capability to execute various applications that are stored in the memory 320.

The memory 320 may include read-only memory (ROM), random-access memory (RAM), electrically erasable programmable ROM (EEPROM), flash cards, or any memory commonly used for computers.

One or more input/output (I/O) ports 340 can be configured to allow the processor 310 to communicate with and control from various I/O devices for the IoT devices. Peripheral devices that may be connected to network interface 300 via the I/O ports 340 include a USB storage device, an SD card or other storage device for transmitting information to or receiving information from the core network 330. In addition to updating applications stored on memory 320 or installing new applications onto the memory via the transceiver 330, a user may alternatively install new applications or update applications on the memory 320 through a user interface such as a USB via the I/O ports 340.

The transceiver 330 comprises a transmitter and a receiver for transmitting data to the core network 130 and receiving data from the core network 130. The transceiver 330 may transmit and receive data via one or more of the following wireless or wired technology standards, Bluetooth, Wi-Fi, Wi-Fi Direct, Long-Term Evolution (LTE) Direct, RF antenna, Ethernet connection, a USB or Firewire connection, etc.

One skilled in the art will recognize that other features may be included in the network interface 300. Further, the components in network interface 300 may be replaced by other components that perform similar functions. In brief, the network interface 200 as shown in FIG. 3 is considered merely illustrative and non-limiting.

Embodiments of this disclosure propose a method of registering IoT devices with the core network 130 and mutual authentication between the IoT devices and core network 130. The method is provided in the form of instructions stored on storage medium and executable by processors of respective IoT devices, cellular devices and core networks.

Registration

In order for an IoT device to access the internal and/or external servers via the core network, the IoT device and the core network are required to have some pre-shared confidential information kept on both sides in order to authenticate with each other. The pre-shared confidential information (i.e. credential) is kept in the HSS of a core network and a secured database of the IoT device. The credential may include Access ID, Key and control parameters.

Registration of an IoT device, i.e. SD, can be performed in a few approaches such as (1) MD initiates the request and core network creates an Access ID and a key for the SD, (2) MD creates an Access ID and a key for a SD, and sends the Access ID and the key to both the SD and the core network, or (3) combination of approaches (1) and (2). Further details will be described below.

Figure 4:
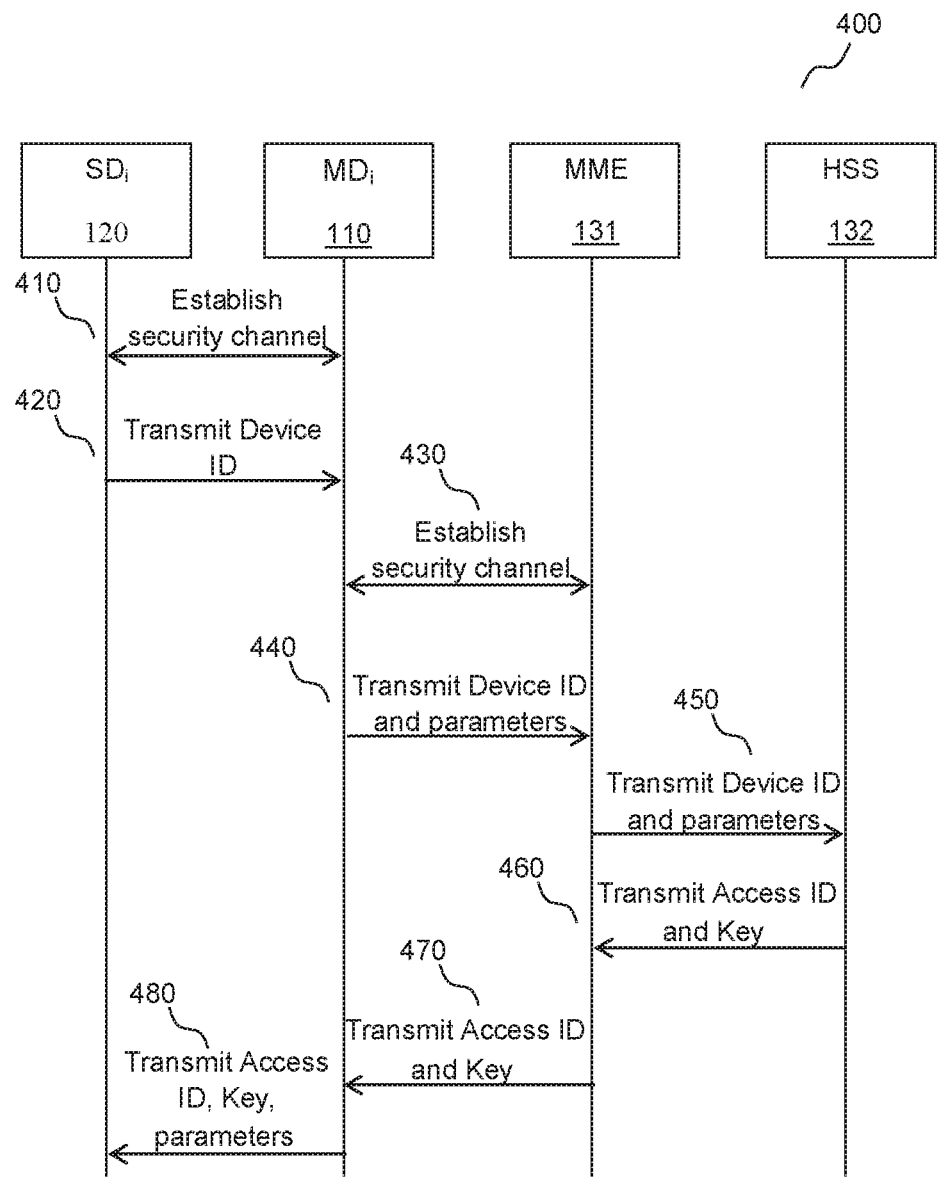
FIG. 4 illustrating a timing diagram of a first process of registration of a device without SIM in accordance with an embodiment of this disclosure.

FIG. 4 illustrates a timing diagram 400 on the process of MDi initiating a request for Access ID and a key for the SDi in accordance with an embodiment of this disclosure. Timing diagram begins with step 410 where SDi and MDi establish a security channel. Further details of the establishing the security channel will be described below with reference to FIG. 5.

In step 420, SDi sends its identity information (such as Device IDi) to MDi within the security channel. The MDi and core network then establish a security channel through the conventional 3GPP authentication schemes in step 430. Further details of the security channel will be described below with reference to FIG. 5.

In step 440, within the security channel, MDi sends Device IDi and control parameters (optional) to the MME. In response to receiving the Device IDi, the MME then sends Device IDi and control parameters (optional) to the HSS in step 450.

Upon receiving the Device IDi, the HSS generates an Access IDi and a Key Ki based on the Device Di in step 460.

Thereafter, the HSS sends the Access IDi and the Ki to the MME in step 470. Further details of generating the Access Di and a Key Ki will be described below with reference to FIG. 7.

In response to receiving the Access Di and the Ki, the MME/Local RAN controller sends the Access Di and the Ki to the MDi inside the security channel in step 480. The MDi then sends the Access IDi and the Ki to SDi inside the security channel in step 480. Timing diagram ends after step 480.

Each MD may manage several SDs. The allocated Access IDs, Keys, and Control Parameter for each associated SD are stored with the MD or tag to the MD. A possible storage format is given in the following table.

| Device $ID_1$ | Access $ID_1$ | $K_1$ | Control Parameter 1 (optional) |
|---|---|---|---|
| Device $ID_2$ | Access $ID_2$ | $K_2$ | Control Parameter 2 (optional) |
| Device $ID_3$ | Access $ID_3$ | $K_3$ | Control Parameter 3 (optional) |
| Device $ID_4$ | Access $ID_4$ | $K_4$ | Control Parameter 4 (optional) |
| ... | ... | ... | ... |

Each HSS stores details of several MDs. The allocated Access IDs, Keys, and Control Parameter for each associated SD tagged to the MD may be stored on the HSS in a storage format in the following table.

| | | | | |
|---|---|---|---|---|
| Master Device 1 IMSI | Device $ID_1$ | Access $ID_1$ | $K_1$ | Control Parameter 1 (optional) |
| | Device $ID_2$ | Access $ID_2$ | $K_2$ | Control Parameter 2 (optional) |
| | Device $ID_3$ | Access $ID_3$ | $K_3$ | Control Parameter 3 (optional) |
| | Device $ID_4$ | Access $ID_4$ | $K_4$ | Control Parameter 4 (optional) |
| | ... | ... | ... | ... |
| Master Device 2 IMSI | Device $ID_1$ | Access $ID_1$ | $K_1$ | Control Parameter 1 (optional) |
| | Device $ID_2$ | Access $ID_2$ | $K_2$ | Control Parameter 2 (optional) |
| | ... | ... | ... | ... |

In the procedure, two network elements namely, MME and HSS are involved. HSS is a network element that stores the root key of the MD and stores the Access IDi and Ki for SDi. In practice, one skilled in the art will recognize that any network element such as AAA having the same function as the HSS can replace the HSS in this procedure without departing from this disclosure. MME is responsible for authenticating the MD and build up security channel using the existing technologies such as AKA. In practice, one skilled in the art will recognize that any network element such as the Local RAN Controller having the same function as the MME can replace the MME in this procedure without departing from this disclosure.

Figure 5:
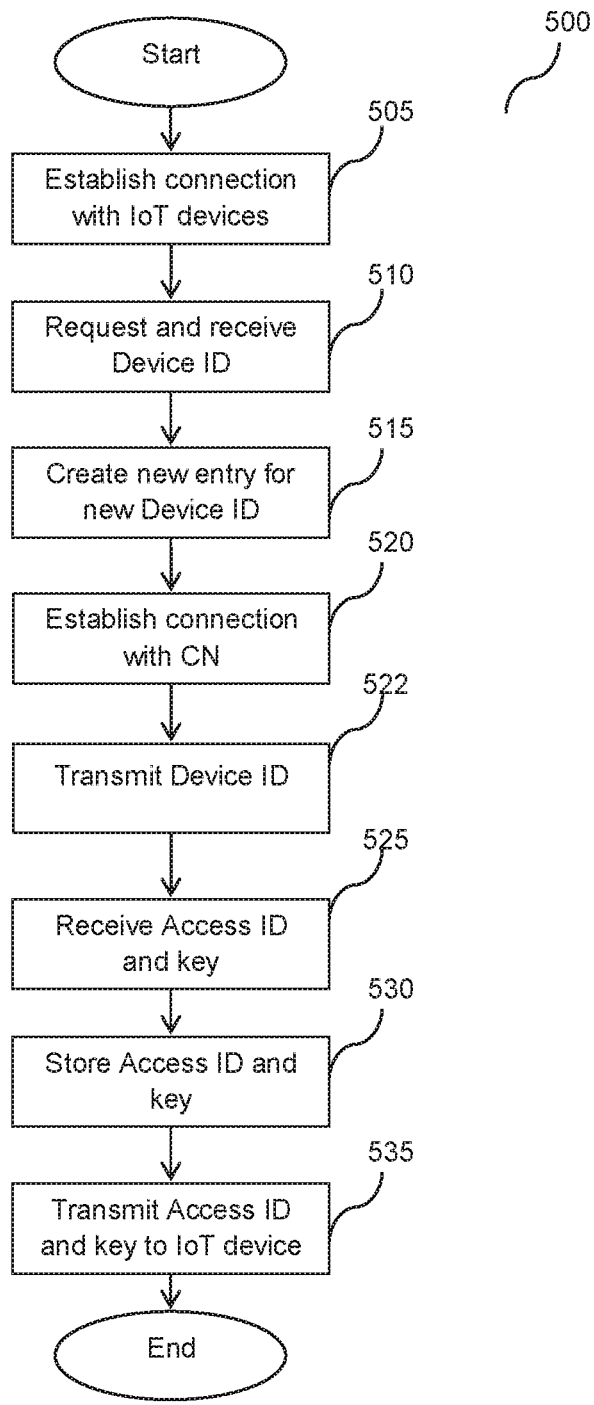
FIG. 5 illustrating a process flow performed by a cellular device according to the first process of registration in accordance with an embodiment of this disclosure.

FIG. 5 illustrates a process flow 500 performed by the MD in accordance with the registration procedure of timing diagram 400. Process 500 beings with step 505 by establishing a connection with the SDi. Particularly, the MDi establishes a security channel to allow transferring of data between the MDi and the SDi. The security channel establishment between the SDi and MD can be through any form of short distance wireless communications technologies such as WiFi, Bluetooth, Zigbee, or through any wired communications technologies.

Upon establishing a security channel, the MDi request for an identity information (Device IDi) from each of the SDi in step 510. In response to receiving the Device IDi from each of the SDi in step 510, process 500 proceeds to step 515 to create a new entry if the Device IDi has not been recorded in the database of the MDi. Each entry comprises Device IDi, Access Keyi and control parameter. The control parameter in this regard may be setting of a limit on the cellular data usage for the SDi. The control parameter is set to a default parameter which may be a limit of a pre-determined data limit. One skilled in the art will recognize that other control parameters may be implemented without departing from this disclosure.

In step 520, process 500 establishes a connection with the core network. Particularly, the MDi and the core network establish a security channel to allow transferring of data between the MD and the core network. The security channel establishment between the MDi and core network can be through any of the existing mutual authentication protocols such as AKA, GAA/GBA.

In step 522, the MDi generates and transmits a message containing the Device Di and the control parameter to the MME of the core network upon establishing the security channel.

In step 525, the MDi receives a response message containing the Access IDi and key from the core network. In response, the MDi append to the entry associated to the Device IDi in step 530 to include the Access IDi and key. Thereafter, the MDi transmits the Access IDi and key to the SDi in step 535. Process 500 ends after step 535.

Figure 6:
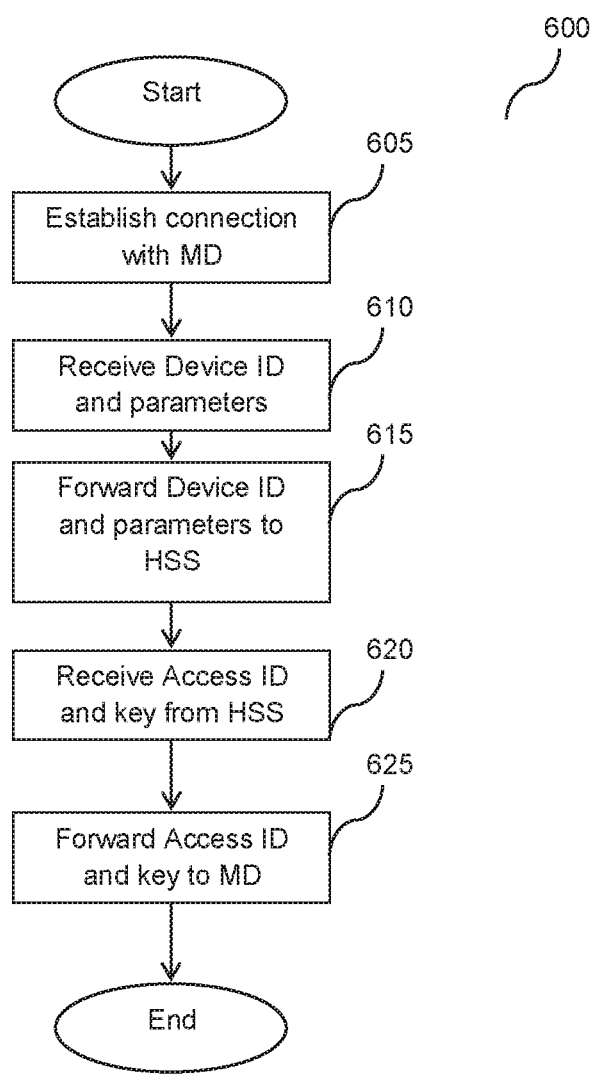
FIG. 6 illustrating a process flow performed by a MME in a core network according to the first process of registration in accordance with an embodiment of this disclosure.

FIG. 6 illustrates a process flow 600 performed by the MME in accordance with the registration procedure of timing diagram 400. Process 600 begins with step 605 by establishing a connection with the MDi. Particularly, the core network and the MDi establish a security channel to allow transferring of data between the core network and the MDi. The security channel establishment between the core network and the MDi can be through any of the existing mutual authentication protocols such as AKA, and GAA/GBA.

Upon establishing a security channel with the MDi, the MME receives a message containing the Device IDi and control parameters from the MDi in step 610. The identity of the MD (MD IDi) is also obtained via the message received from the MDi. The identity of the MD may be International Mobile Subscriber Identity (IMSI) or International Mobile Station Equipment Identity (IMEI). In response to receiving the Device IDi and control parameters, the MME forward the MD IDi, Device Di and the parameters to the HSS in step 615.

In step 620, the MME receives a response message containing the Access Di and key from the HSS. The Access IDi and Keyi are then transmitted to the MDi. Process 600 ends after step 625.

Figure 7:
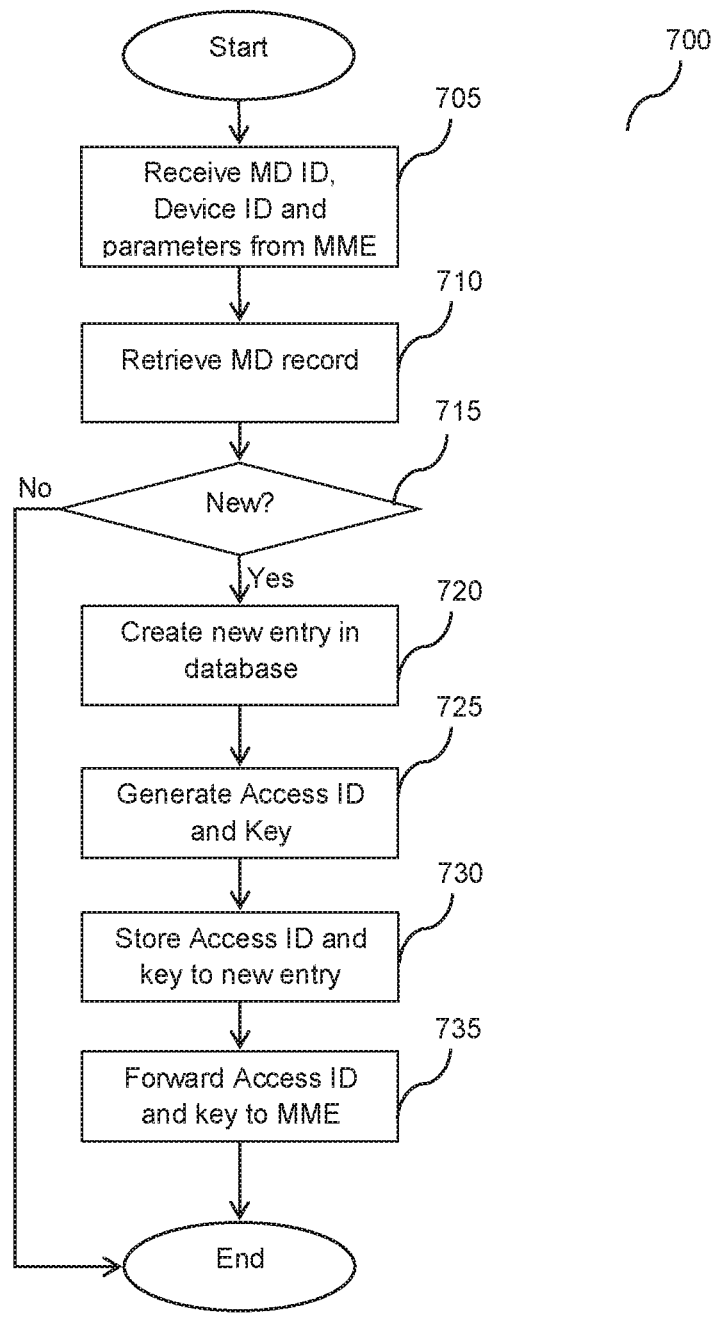
FIG. 7 illustrating a process flow performed by a HSS in a core network according to the first process of registration in accordance with an embodiment of this disclosure.

FIG. 7 illustrates a process flow 700 performed by the HSS in accordance with the registration procedure of timing diagram 400. Process 700 begins by receiving MD IDi, Device IDi and control parameters from the MME. In response to receiving MD IDi, Device Di and parameters, the HSS retrieves the record for MDi in step 710. The record for MDi is a list containing all the MDs being registered with the HSS. Process 700 then determines if the Device IDi has already been recorded in the record for the MDi. If the Device Di has not been recorded in the record for the MDi, process 700 proceeds to step 720 to create a new entry in database for the new Device IDi. If the Device IDi has been recorded in the record for the MDi, process 700 ends.

In step 725, the HSS generates an Access IDi and Keyi for the Device IDi. Access IDi may be generated by combining the MDi's identity with SDi's identity. For example, by combining 1) MD IMSI with Device IDi, 2) MD IMSI with SDi's IMEI, 3) MD IMEI with Device IDi, or 4) MD IMEI with SDi's IMEI. In another embodiment, the Access Di may be generated by combining the MDi's identity with a Sequence Number that is assigned to SDi by the HSS. In yet another embodiment, the Access Di may be generated by combining the MDi's identity with a randomly generated number generated by HSS for SDi. Alternatively, the Access Di may be generated by a sequence number assigned to SDi by the HSS or a random number generated by the HSS for SDi. One skilled in the art will recognise that any combination may be implemented without departing from the disclosure.

Keyi may be generated by the following methods: 1) randomly chosen by the HSS; 2) obtained by using Key Derivation Function (KDF); 3) parameters used for key derivation which may include the identity of the MDi (such as MD IMSI, MD IMEI), the identity of the SDi (such as Device IDi, Device IMEI), the key of MD, Access IDi, and other optional parameters. One skilled in the art will recognize that in addition to the random alphanumeric chosen by HSS/AAA, alphanumeric obtained by KDF or alphanumeric of parameters, hash function may be used to further encrypt the alphanumeric without departing from the disclosure.

The HSS then stores the Access Di and key to the new entry in step 730. Thereafter, the HSS generates and transmits a response message containing the Access IDi and key to the MME. Process 700 ends after step 735.

Figure 8:
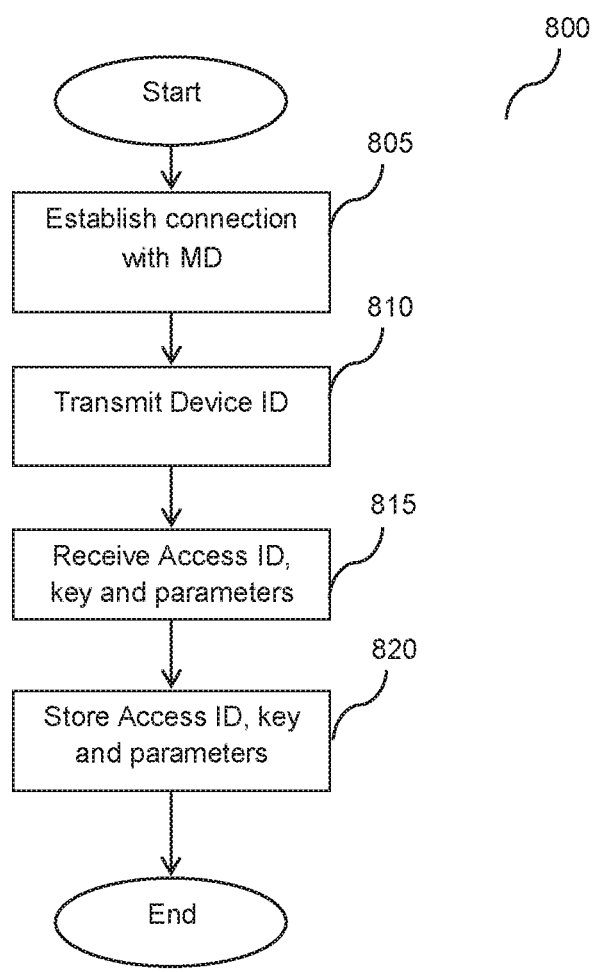
FIG. 8 illustrating a process flow performed by a device without SIM card according to the first process of registration in accordance with an embodiment of this disclosure.

FIG. 8 illustrates a process flow 800 performed by the SDi in accordance with the registration procedure of timing diagram 400. Process 800 begins with step 805 by establishing a connection with the MDi.

In step 810, the SDi transmits its Device Di to the MDi upon establishing a security channel with the MDi. The SDi then waits for the Access IDi, Keyi and parameters from the MDi.

In step 815 receives the Access IDi, key and parameters from the MDi and stores the Access IDi, Keyi and parameters in step 820. Process 800 ends after step 820.

Figure 9:
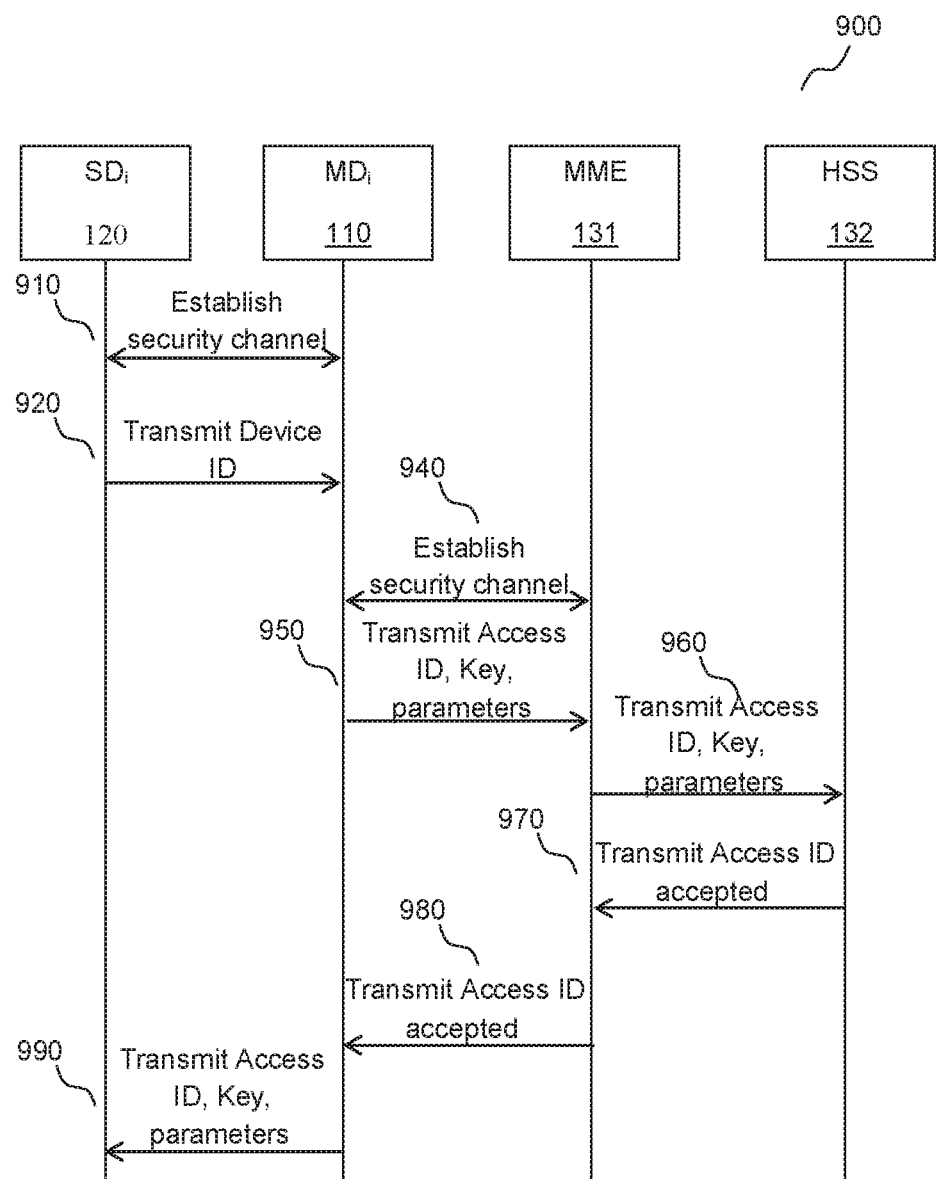
FIG. 9 illustrating a timing diagram of a second process of registration of a device without SIM in accordance with an embodiment of this disclosure.

FIG. 9 illustrates a timing diagram 900 on the process of MDi generating an Access IDi and a key for the SDi in accordance with an embodiment of this disclosure. Timing diagram 900 begins with step 910 where SDi and MDi establish a security channel. The details of the establishing the security channel is similar to that described above with reference to FIG. 5.

In step 920, SDi sends its identity information (such as Device IDi) to MDi within the security channel. The MDi then generates an Access IDi and a Keyi based on the Device Di or other information. Further details on generating of the Access IDi and a Keyi will be described below with reference to FIG. 10.

In step 940, the MDi and core network establish a security channel through the conventional 3GPP authentication schemes. The details of the security channel are similar to that described above with reference to FIG. 5.

In step 950, within the security channel, MDi transmits Device IDi, Access IDi, Keyi and control parameters (optional) to the MME. In response to receiving the data from the MDi, the MME transmits the data to the HSS in step 960.

Upon receiving the data, the HSS stores the data in a new entry and transmits an Access IDi acceptance message to the MME in step 970. Thereafter, the MME transmits the Access IDi acceptance message to the MDi in step 980.

In response to receiving the Access IDi message, the MDi stores the Access Di and the Ki and transmits the Access IDi, the Ki and parameters to the SDi in step 990. Timing diagram 900 ends after step 990.

Figure 10:
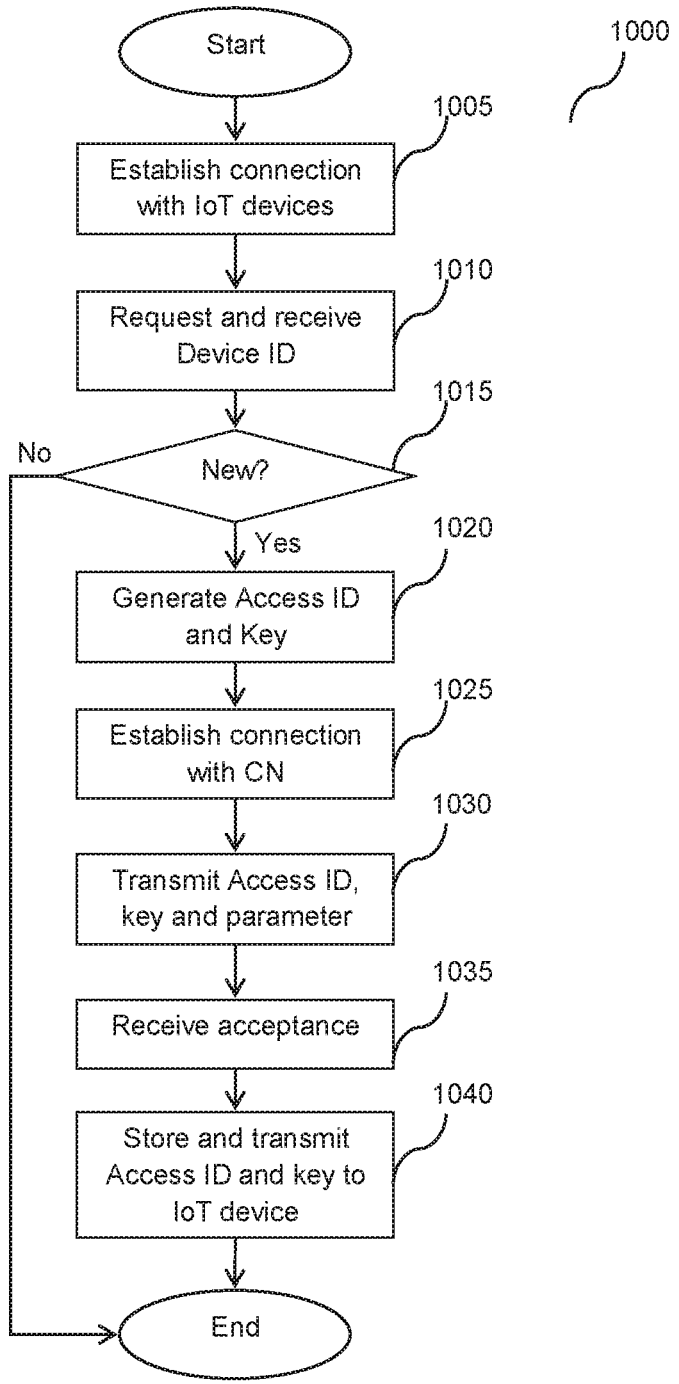
FIG. 10 illustrating a process flow performed by the cellular device according to the second process of registration in accordance with an embodiment of this disclosure.

FIG. 10 illustrates a process flow 1000 performed by the MDi in accordance with the registration procedure of timing diagram 900. Process 1000 begins with step 1005 by establishing a connection with the SDi. Particularly, the MDi establishes a security channel to allow transferring of data between the MDi and the SDi. The security channel establishment between the SDi and MDi can be through any form of short distance wireless communications technologies such as WiFi, Bluetooth, Zigbee, or through any wired communications technologies.

Upon establishing a security channel, the MDi request for Device Di from each of the SDi in step 1010. In response to receiving the Device Di from each of the SDi in step 1010, process 1000 determines if the Device Di has been recorded in the database of the MD in step 1015. Each Device Di is recorded in the database of the MDi and comprises Device IDi, Access IDi, key and control parameter. The control parameter in the regard may be setting of a limit on the cellular data usage for the SDi. The control parameter is set to a default parameter which may be a limit of a predetermined data limit. One skilled in the art will recognize that other parameters may be implemented without departing from this disclosure.

In step 1020, the MDi generates an Access Di and key for the Device IDi. Access Di may be generated by combining the MD's identity with SDi's identity. For example, by combining 1) MD IMSI with Device IDi, 2) MD IMSI with Device i's IMEI, 3) MD IMEI with Device IDi, or 4) MD IMEI with Device i's IMEI. In another embodiment, the Access Di may be generated by combining the MD's identity with a Sequence Number that is assigned to SDi by the MDi. In yet another embodiment, the Access IDi may be generated by combining the MD's identity with a randomly generated number generated by MDi for SDi. Alternatively, the Access IDi may be generated by a sequence number assigned to SDi by the MDi or a random number generated by the MDi for SDi. One skilled in the art will recognise that any combination may be implemented without departing from the disclosure.

Ki may be generated by the following methods: 1) randomly chosen by the MDi; and 2) parameters used for key derivation which may include the identity of the MDi (such as MD IMSI, MD IMEI), the identity of the SDi (such as Device IDi, Device IMEI), the key of MDi, Access IDi, and other optional parameters. One skilled in the art will recognize that in addition to the random alphanumeric chosen by MD, or alphanumeric of parameters, hash function may be used to further encrypt the alphanumeric without departing from the disclosure.

In step 1025, the MDi establishes a connection with the core network. Particularly, the MDi and the core network establish a security channel to allow transferring of data between the MDi and the core network. The security channel establishment between the MDi and core network can be through any of the existing mutual authentication protocols such as AKA, GAA/GBA.

In step 1030, the MDi generates and transmits a message containing the Device IDi, Access IDi, Keyi and control parameter to the MME of the core network. The MDi then waits for a response from the core network. In step 1035, the MDi receives a response message containing an acceptance message from the core network. In response to receiving the acceptance message, the MDi creates a new entry, comprising Device IDi, Keyi and control parameter for the SDi and stores the entry in the database. Thereafter, the MDi transmits the Access IDi, key and control parameter to the SDi in step 1040. Process 1000 ends after step 1040.

Figure 11:
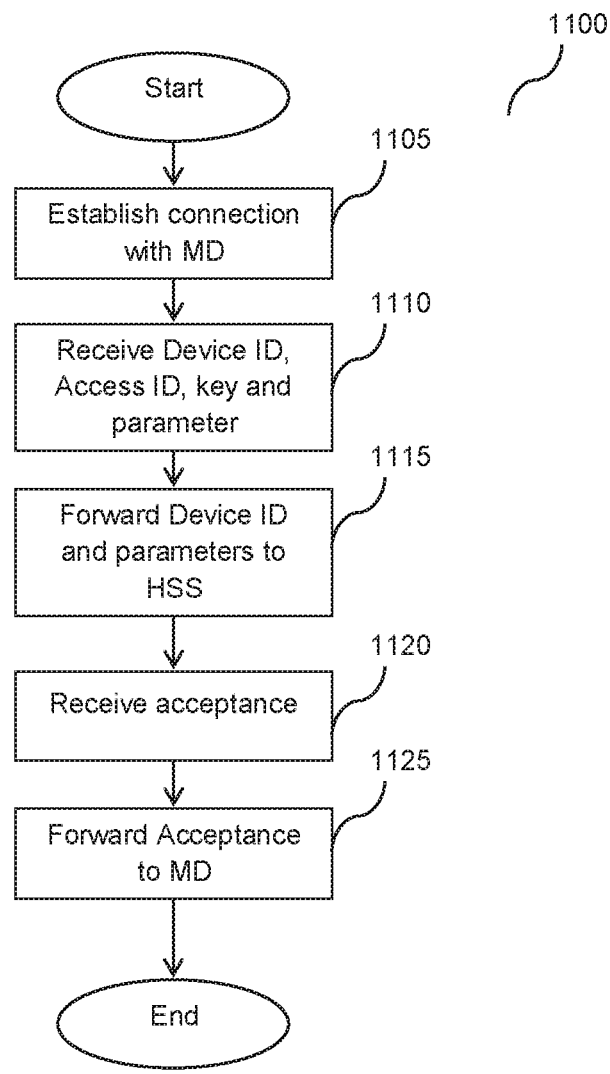
FIG. 11 illustrating a process flow performed by the MME in the core network according to the second process of registration in accordance with an embodiment of this disclosure.

FIG. 11 illustrates a process flow 1100 performed by the MME in accordance with the registration procedure of timing diagram 900. Process 1100 begins with step 1005 by establishing a connection with the MDi. Particularly, the core network and the MDi establish a security channel to allow transferring of data between the core network and the MDi. The security channel establishment between the core network and the MDi can be through any of the existing mutual authentication protocols such as AKA, and GAA/GBA.

Upon establishing a security channel with the MDi, the MME receives a message containing the Device IDi, Access IDi, Keyi and parameters from the MDi in step 1110. In response to receiving the Device Di and parameters, the MME forward the MD IDi, Device IDi, Access IDi, Keyi and control parameters to the HSS in step 1115.

In step 1120, the MME receives a response message containing an acceptance message from the HSS. The acceptance message is then transmitted to the MDi in step 1125. Process 1100 ends after step 1125.

Figure 12:
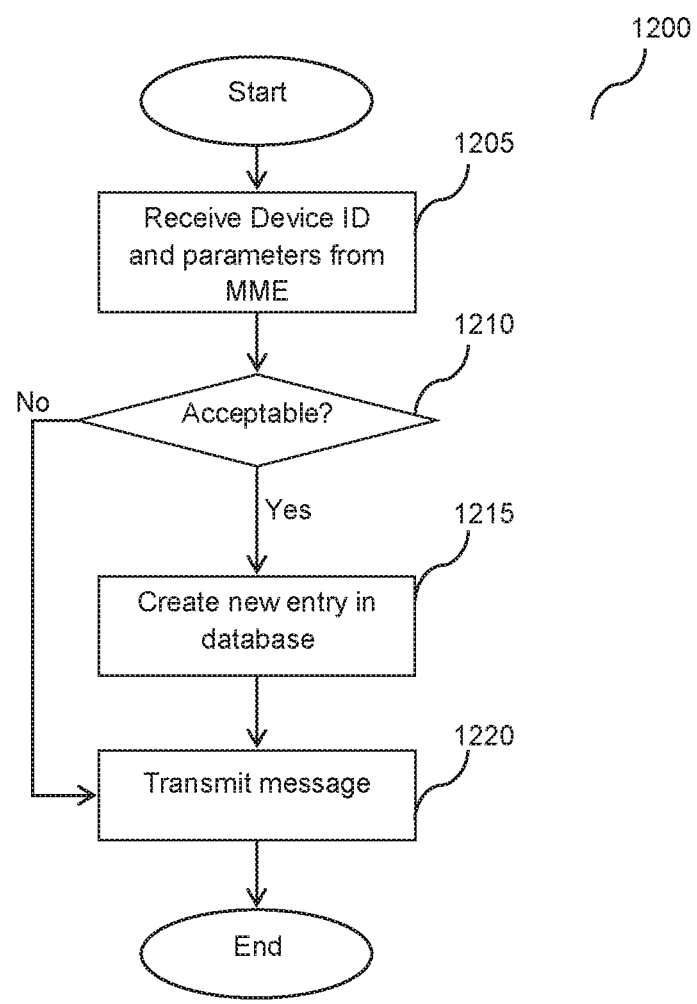
FIG. 12 illustrating a process flow performed by the HSS in the core network according to the second process of registration in accordance with an embodiment of this disclosure.

FIG. 12 illustrates a process flow 1200 performed by the HSS in accordance with the registration procedure of timing diagram 900. Process 1200 begins with step 1205 by receiving the Device IDi, Access IDi, key and parameter.

In step 1210, HSS checks whether the Access Di is acceptable. In particular, the HSS checks the format of the Access ID is in a standardized format. The standardized format of the Access ID is the same as that generated in step 1020, i.e. combination of the MD's identity with SD's identity. Further details and examples are described above with reference to step 1020. In other words, the process of generating the Access ID by the MD is shared with the HSS. If the format of the Access ID follows certain rules, then the Access ID is acceptable. Otherwise, it will not accept the Access D.

If the Access IDi is acceptable, process 1200 proceeds to step 1215. If the Access IDi is not acceptable, process 1200 generates a response message containing a non-acceptance message and proceeds to step 1220 to transmit the non-acceptance message to the MME.

In step 1215, the HSS creates a new entry a list of MDs in the database comprising the Device IDi, Access IDi, Keyi and parameters. The HSS then generates a response message containing an acceptance message.

In step 1220, the HSS transmits the response message containing either the acceptance message or non-acceptance message to the MME. Process 1200 ends after step 1220.

The process flow of the SDi in accordance with the registration procedure of timing diagram 900 is similar to that of process 800.

The combination of timing diagrams 400 and 900 will now be described below with reference to FIG. 13-15.

Figure 13:
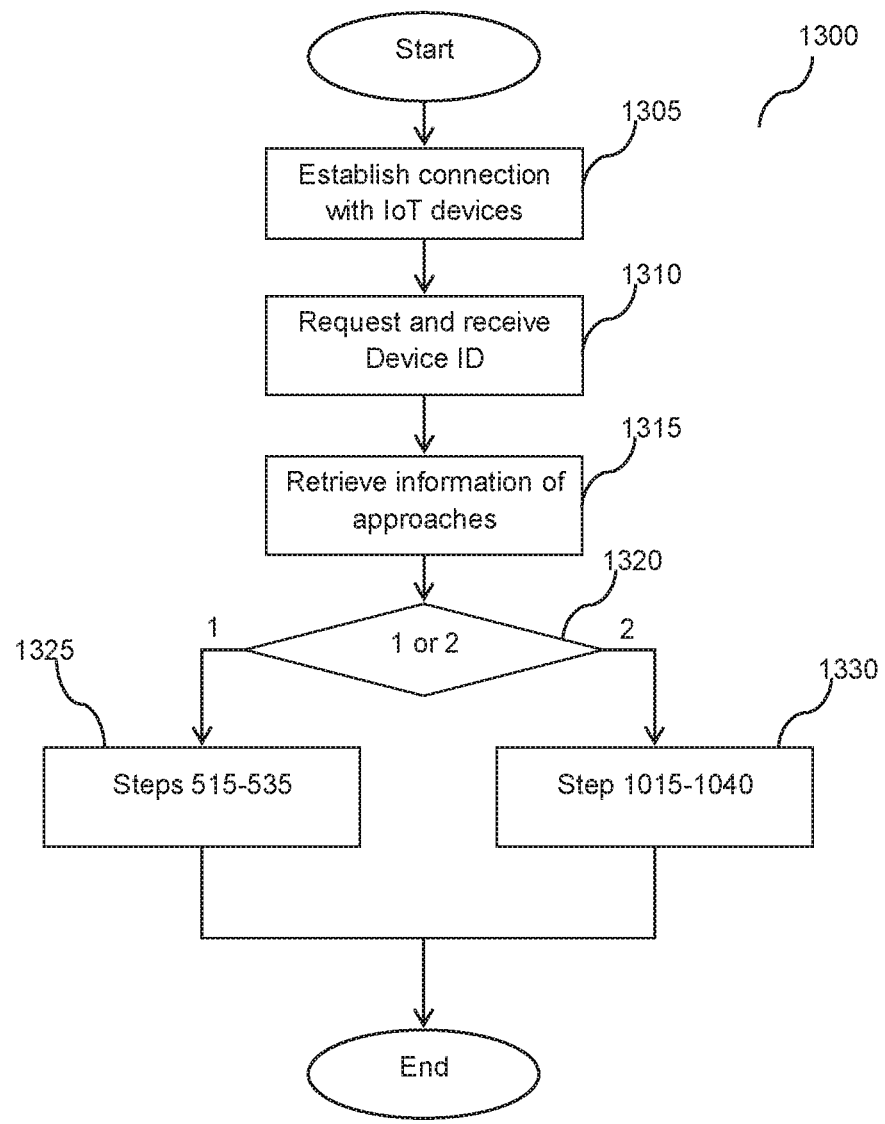
FIG. 13 illustrating a process flow performed by the cellular device according to the combination of the first and second process of registration in accordance with an embodiment of this disclosure.

FIG. 13 illustrates the process flow 1300 performed by the MDi in accordance with the registration procedure of a combination of timing diagrams 400 and 900. Process 1300 begins with step 1305 by establishing a connection with the SDi. Particularly, the MDi establishes a security channel to allow transferring of data between the MDi and the SDi. The security channel establishment between the SDi and MDi can be through any form of short distance wireless communications technologies such as WiFi, Bluetooth, Zigbee, or through any wired communications technologies.

Upon establishing a security channel, the MDi request for Device Di from each of the SDs in step 1310. In response to receiving the Device IDi from each of the SDs in step 1310, process 1300 retrieves the information of approaches from the database in step 1315. The MDi then determines which approach to prosecute in step 1320.

If the information of approaches is approach 1, process 1300 proceeds to step 1325 and continue with steps 515-535 of process 500 where the Access ID and key are generated by the HSS. If the information of approaches is approach 2, process 1300 proceeds to step 1330 and continue with steps 1015-1040 of process 1000 where the Access ID and key are generated by the MD. Process 1300 ends after 1325 or 1330.

Figure 14:
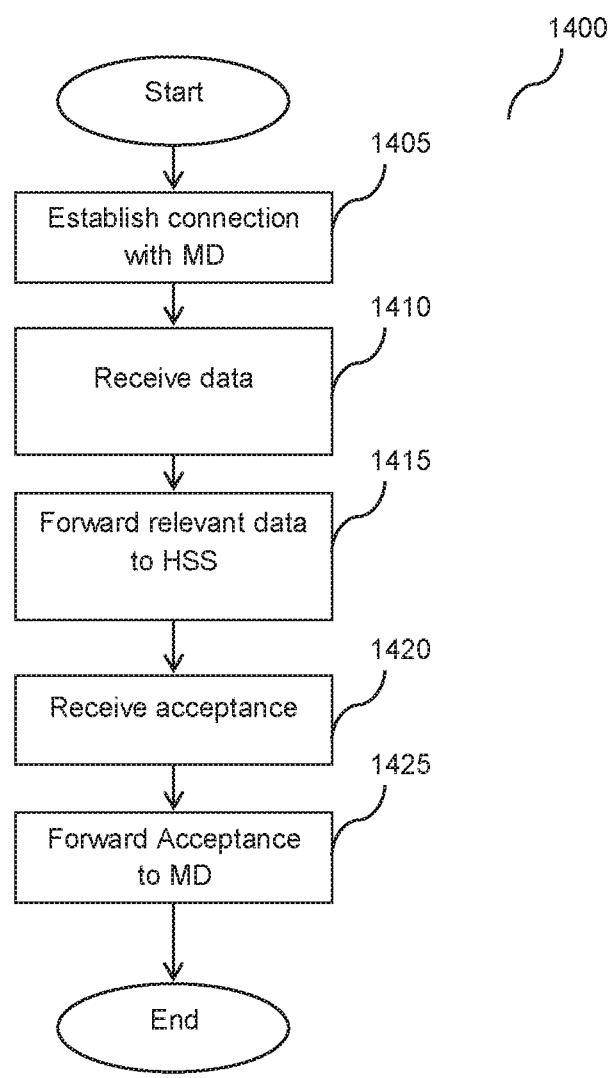
FIG. 14 illustrating a process flow performed by the MME in the core network according to the combination of the first and second process of registration in accordance with an embodiment of this disclosure.

FIG. 14 illustrates the process flow 1400 performed by the MME in accordance with the registration procedure of a combination of timing diagrams 400 and 900. Process 1400 begins with step 1405 by establishing a connection with the MDi. Particularly, the core network and the MDi establish a security channel to allow transferring of data between the core network and the MDi. The security channel establishment between the core network and the MDi can be through any of the existing mutual authentication protocols such as AKA, and GAA/GBA.

Upon establishing a security channel with the MDi, the MME receives data from the MDi in step 1410. The MME reviews the data and forward the necessary data from the data received to the HSS. For example, if the data from the MDi are Device IDi, Access IDi, key and parameters, the MME forwards the MD IDi, Device IDi, Access IDi, Keyi and parameters to the HSS in step 1415. If the MME receives the Device Di and parameters from the MDi, the MME forwards the MD IDi, Device IDi and the parameters to the HSS in step 1515.

In step 1420, the MME receives a response message from the HSS and forward the response message to the MDi in 1425. The response message may contain one of the followings: 1) Access Di and Keyi; 2) acceptance message; or 3) non-acceptable message. Process 1400 ends after step 1425.

Figure 15:
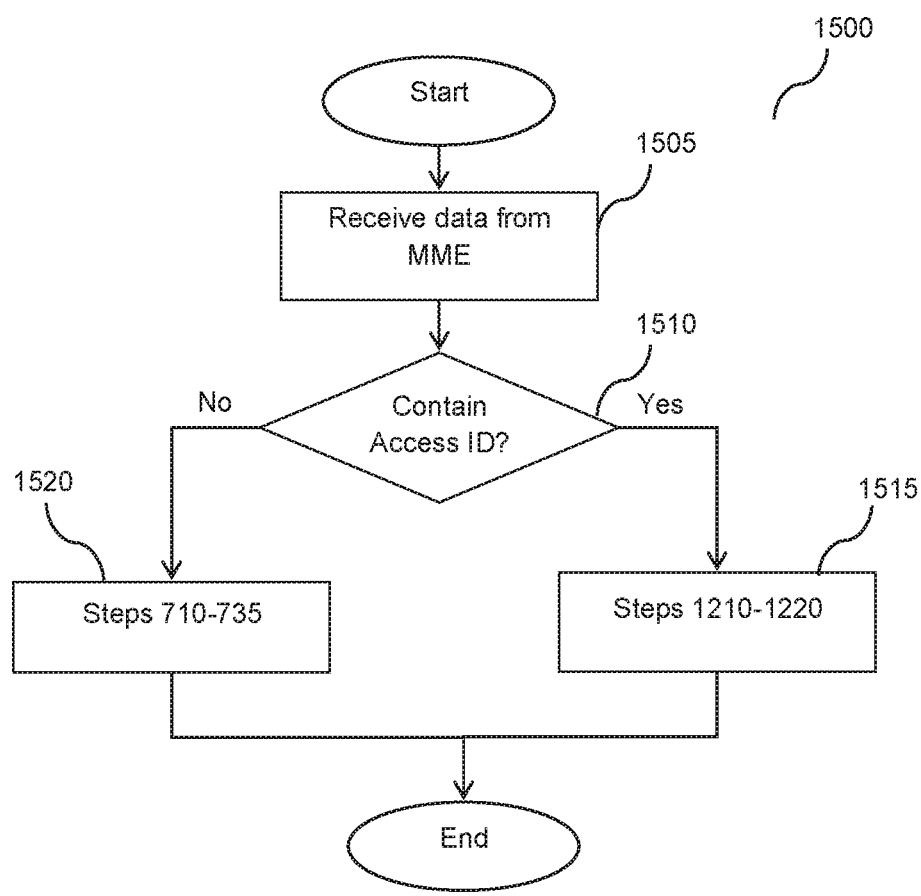
FIG. 15 illustrating a process flow performed by the HSS in the core network according to the combination of the first and second process of registration in accordance with an embodiment of this disclosure.

FIG. 15 illustrates the process flow of the performed by the HSS in accordance with the registration procedure of a combination of timing diagrams 400 and 900. Process 1500 begins with step 1505 by receiving data from the MME.

In step 1510, HSS determines whether the data contains Access IDi. If the data contains Access IDi, process 1500 proceeds to step 1515 and continues with steps 1210-1220. If the data does not contains Access IDi, process 1500 proceeds to step 1520 and continues with steps 710-735. Process 1500 ends after step 1515 or 1520.

Mutual Authentication

Mutual authentication between an IoT device and the core network can be performed in a few schemes based on the credential for each IoT device such as Access ID and the key.

Figure 16:
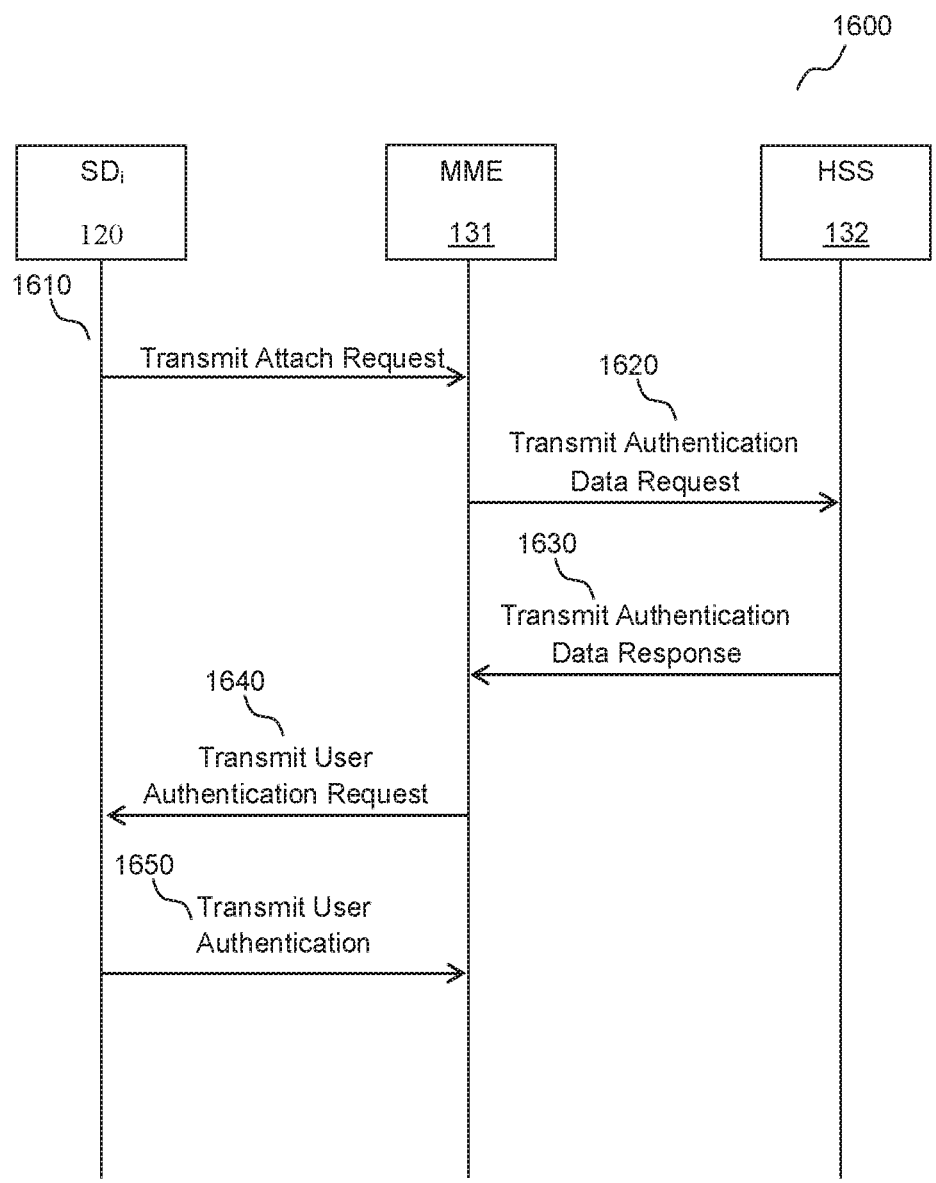
FIG. 16 illustrating a timing diagram of a first mutual authentication process in accordance with an embodiment of this disclosure.

A first mutual authentication between the IoT devices and core network is based on a modified AKA. FIG. 16 illustrates a timing diagram 1600 on the process of the first mutual authentication between the IoT device and core network in accordance with an embodiment of this disclosure.

Timing diagram begins with step 1610 by transmitting an Attach Request comprising its Access IDi to the MME.

Upon receipt of the Attach Request from the SDi, the MME transmits an Authentication Data Request to the HSS in step 1620. The Authentication Data Request includes the Access IDi, the Serving Network Identity (SN IDi), and the Network Type.

In response to receiving the Authentication Data Request from the MME, the HSS locates Ki according to the Access IDi, and computes the authentication vector using EPS AKA algorithm. The HSS then sends an Authentication Data Response with the authentication vectors to the MME in step 1630.

In step 1640, the MME transmits the User Authentication Request to the SDi. The User Authentication Request includes the random number (RAND), and the authentication token AUTNHSS derived from the authentication vector.

Upon receipt of the RAND and AUTNHSS, SDi computes AUTNUE and then authenticates the core network by verifying whether AUTNUE is equal to AUTNHSS. If AUTNUE is equal to AUTNHSS, SDi sends the User Authentication Response to the MME in step 1650.

Upon receipt of the User Authentication Response, the MME authenticates SDi between the information in the User Authentication Response and the information in the Authentication Data Response. If authentication is successful, the MME grants the SDi access to the gateways. Timing diagram 1600 ends after step 1650.

Figure 17:
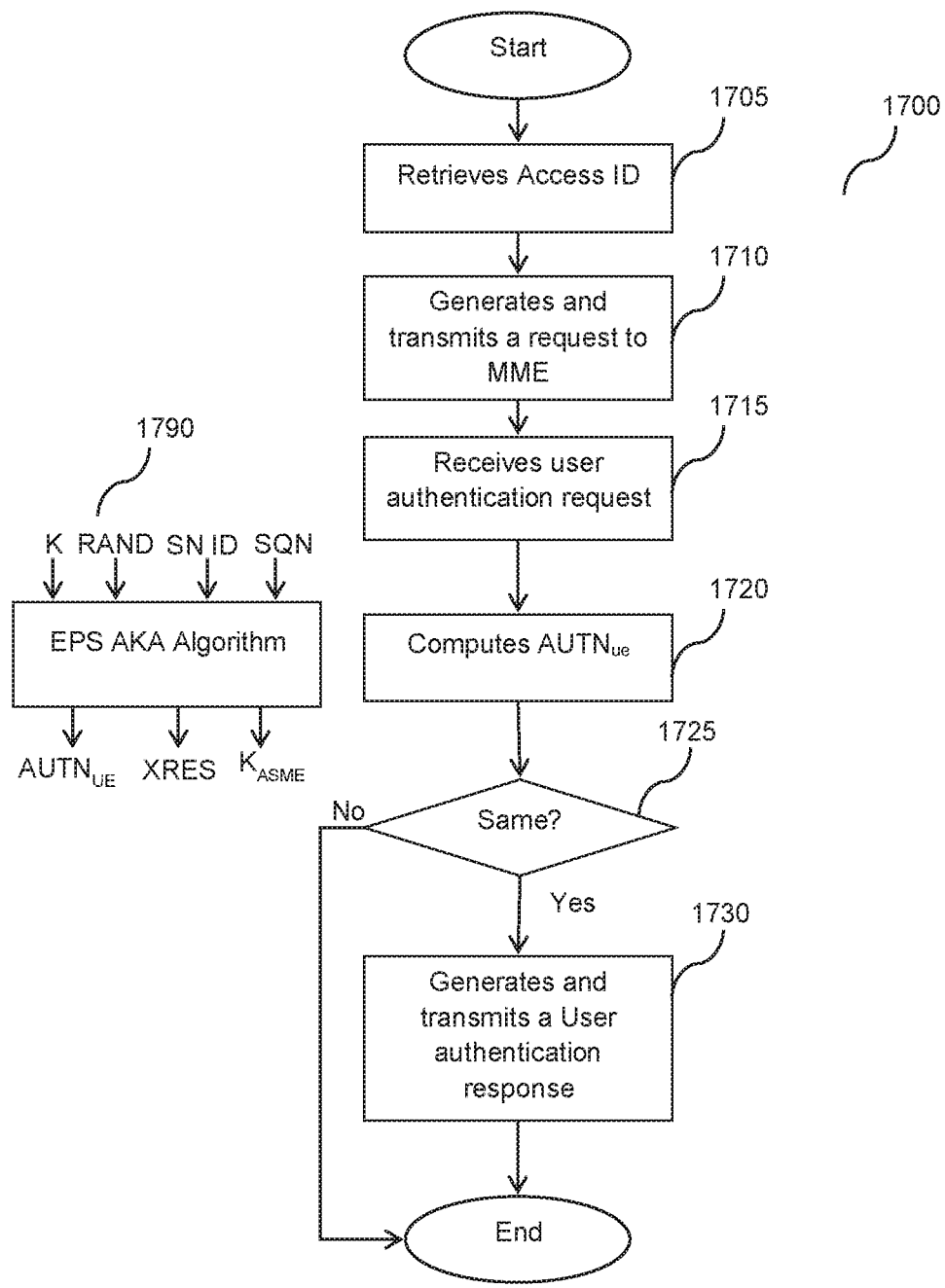
FIG. 17 illustrating a process flow performed by the device without SIM card according to the first mutual authentication process in accordance with an embodiment of this disclosure.

FIG. 17 illustrates a process flow 1700 performed by the SDi in accordance with the first mutual authentication procedure of timing diagram 1600. Process 1700 begins with step 1705 by retrieving its Access IDi and Ki. In step 1710, the SDi generates and transmits an Attach Request comprising the Access IDi.

In step 1715, the SDi receives a User Authentication Request from the MME. The User Authentication Request includes the random number (RAND), and the authentication token AUTNHSS derived from the authentication vector generated by the HSS.

In step 1720, the SDi computes the authentication vector using the EPS AKA algorithm 1790. The input parameters for the EPS AKA algorithm include Ki, RAND, SN IDi, and SQN. The output parameters from the EPS AKA key derivation function algorithm include an authentication token (AUTNUE), a response parameter (RES), and KASME.

In step 1725, the SDi authenticates with the core network by verifying whether AUTNUE is equal to AUTNHSS. If the AUTNUE is not equal to AUTNHSS, process 1700 ends. If AUTNUE is equal to AUTNHSS, the SDi generates and transmits a User Authentication Response message to the MME in step 1730. The User Authentication Response message includes RES determined in step 1720. Process 1700 ends after step 1730.

Figure 18:
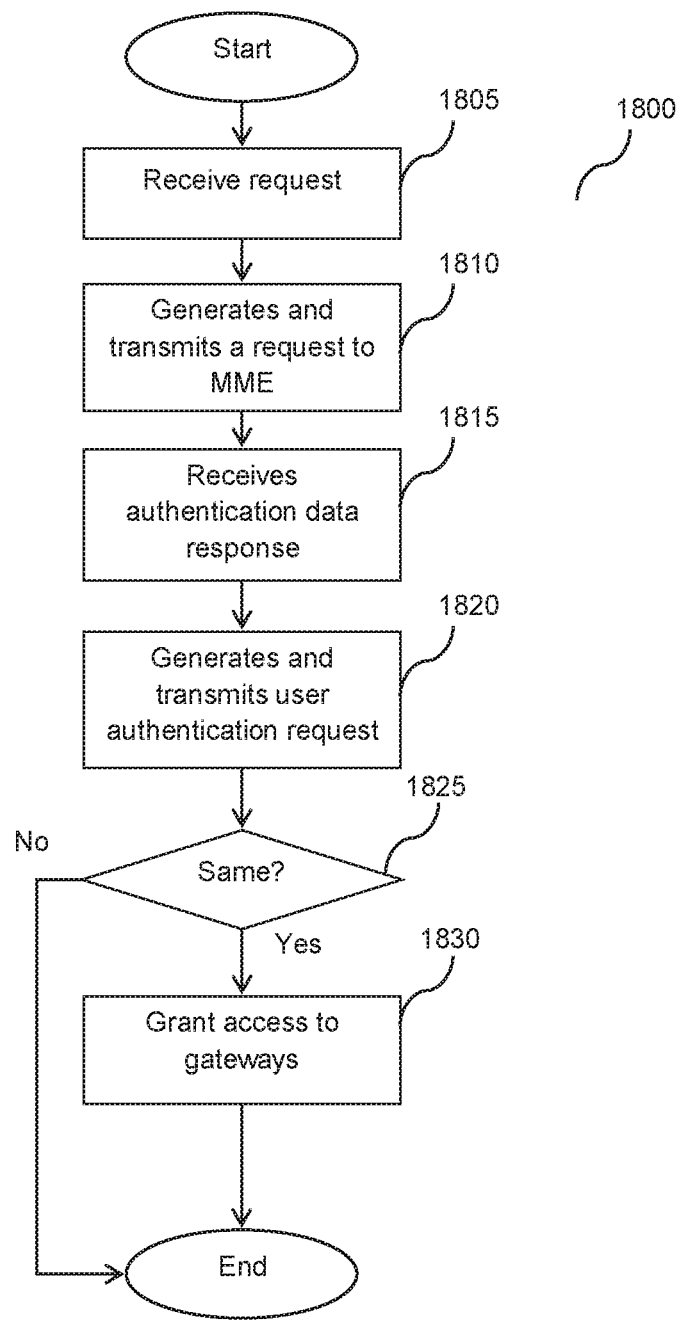
FIG. 18 illustrating a process flow performed by the MME in the core network according to the first mutual authentication process in accordance with an embodiment of this disclosure.

FIG. 18 illustrates a process flow 1800 performed by the MME in the core network in accordance with the first mutual authentication procedure of timing diagram 1600. Process 1800 begins with step 1805 by receiving the Attach Request from the SDi.

In step 1810, the MME generates and transmits an Authentication Data Request to the HSS based on the Attach Request received from the SDi. Other information such as the SN IDi and network type can be retrieved by the MME based on the request received from the SDi. The Authentication Data Request includes Access IDi, SN IDi, and the network type.

In step 1815, the MME receives the Authentication Data Response from the HSS. The MME is aware of the order of the authentication vectors and selects one authentication vector to authenticate with the SDi. In step 1820, the MME generates and transmits a User Authentication Request based on the selected authentication vector to the SDi. The User Authentication Request comprises the RAND and the AUTNHSS from the selected first authentication vector In step 1825, the MME receives the User Authentication Response from the SDi. In response, the MME determines whether RES (from the User Authentication Response) is equal to XRES (from the Authentication Data Response). If RES is not equal to XRES, process 1800 ends. If RES is equal to XRES, MME grants the SDi access to its gateways in step 1830. Particularly, the MME sends a message to the gateways to grant access to the SD. Process 1800 ends after step 1830.

Figure 19:
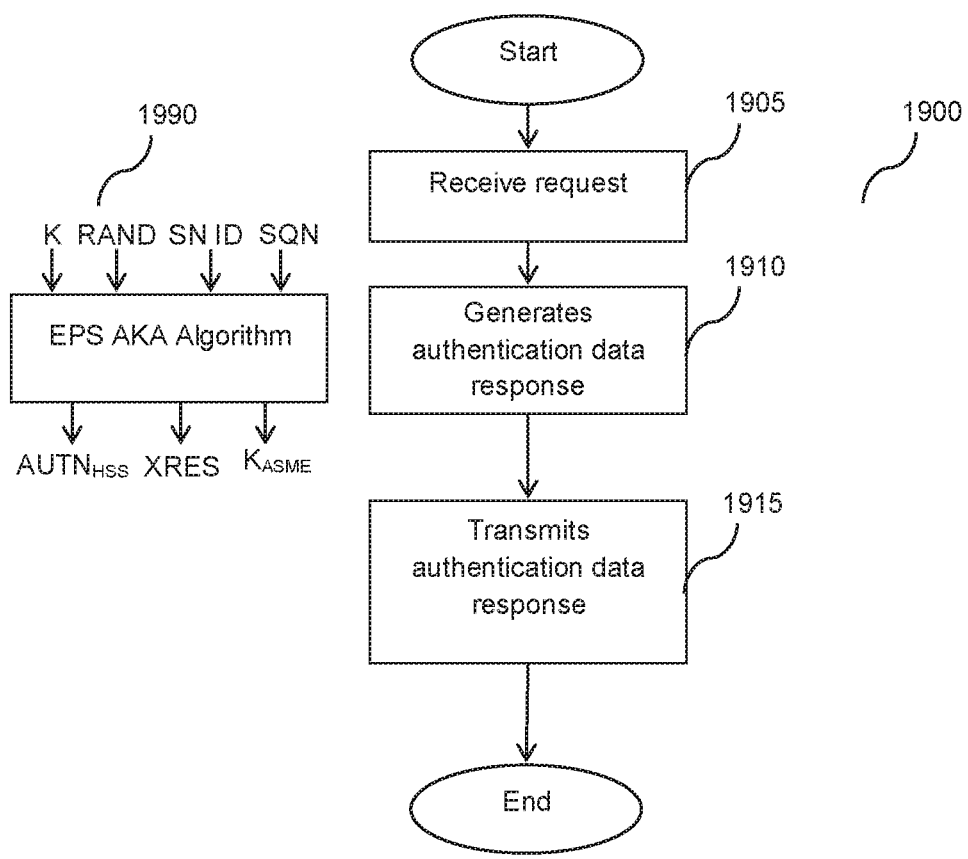
FIG. 19 illustrating a process flow performed by the HSS in the core network according to the first mutual authentication process in accordance with an embodiment of this disclosure.

FIG. 19 illustrates a process flow 1900 performed by the HSS in the core network in accordance with the first mutual authentication procedure of timing diagram 1600. Process 1900 begins with step 1905 by receiving the Authentication Data Request from the MME.

In step 1910, the HSS generates an Authentication Data Response using EPS AKA algorithm 1990 to obtain authentication vectors. Particularly, the HSS computes a number of authentication vectors based on the EPS AKA algorithm and generates the Authentication Data Response using the authentication vectors. The input parameters for the EPS AKA algorithm include Ki, RAND, SN IDi, SQN. The output parameters for the EPS AKA algorithm include AUTNHSS, XRES, and KASME. RAND is a random number derived by the HSS. Each of the authentication vectors includes RAND, AUTNHSS, XRES, and KASME.

The Authentication Data Response is then transmitted to the MME in step 1915. Process 1900 ends after step 1915.

Figure 20:
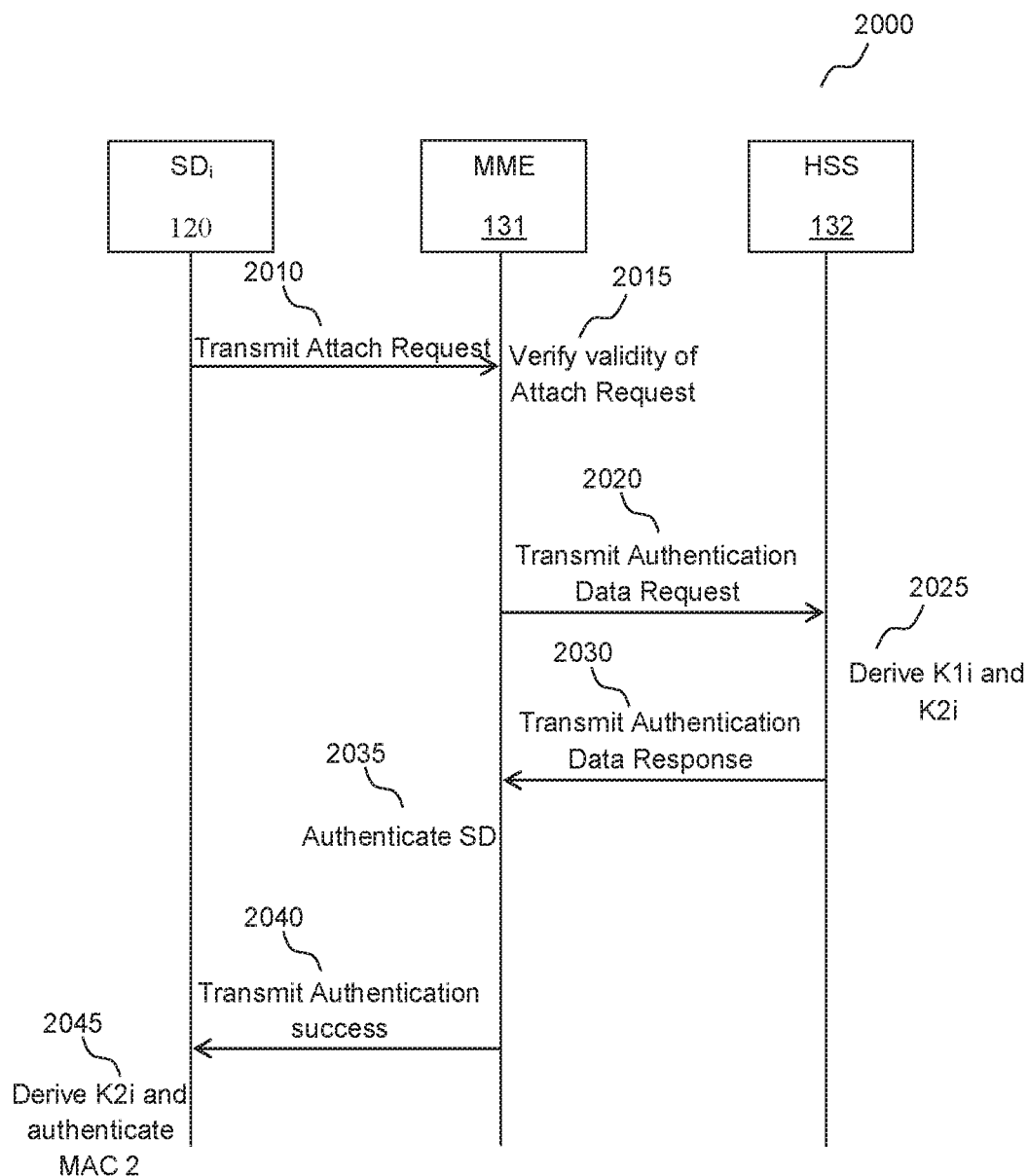
FIG. 20 illustrating a timing diagram of a second mutual authentication process in accordance with an embodiment of this disclosure.

A second mutual authentication between the IoT devices and core network is based on the Access ID and the key. FIG. 20 illustrates a timing diagram 2000 on the process of the second mutual authentication between the IoT device and core network in accordance with an embodiment of this disclosure. Timing diagram 2000 begins with step 2010 by transmitting an Attach Request comprising its Access IDi, RAND 1, Fresh Parameter 1, MAC 1, and other optional parameters to the MME.

In step 2015, in response to receiving the Attach Request, the MME verifies the validity of the Attach Request based on the Fresh Parameter 1. Further details on the verification of the validity of the Attach Request will be described below with reference to FIG. 22.

In step 2020, if the Attach Request is valid, the MME generates and transmits an Authentication Data Request to the HSS. The Authentication Data Request includes the Access IDi and RAND 1.

In step 2025, in response to receiving the Authentication Data Request, the HSS locates from its database key Ki that corresponds to the Access IDi, derives K1i using the KDF with Ki and RAND 1, generates another random number RAND 2 and uses Ki, RAND 1, RAND 2 and other optional parameters to derive K2i. Further details in this regard will be described below with reference to FIG. 23.

In step 2030, the HSS generates and transmits an Authentication Data Response to the MME after deriving K2i. The Authentication Data Response shall include K1i, K2i, RAND 2, Control Parameters (Optional).

In step 2035, the MME authenticates SDi by verifying MAC 1 using K1i. Further details in this regard will be described below with reference to FIG. 22.

In step 2040, if the authentication is successful, the MME generates and transmits an Authentication Success message to the SDi. The Authentication Success message includes a one-bit sign to indicate that the authentication is success, RAND2, Fresh Parameter 2, other Parameters (Optional), and MAC 2. Further details in this regard will be described below with reference to FIG. 22.

In step 2045, the SD derives K2i and authenticates the core network by verifying MAC 2 using K2i. If authentication is successful, the SD continues to transmit and receive data with the core network. Timing diagram 2000 ends after step 2045.

Figure 21:
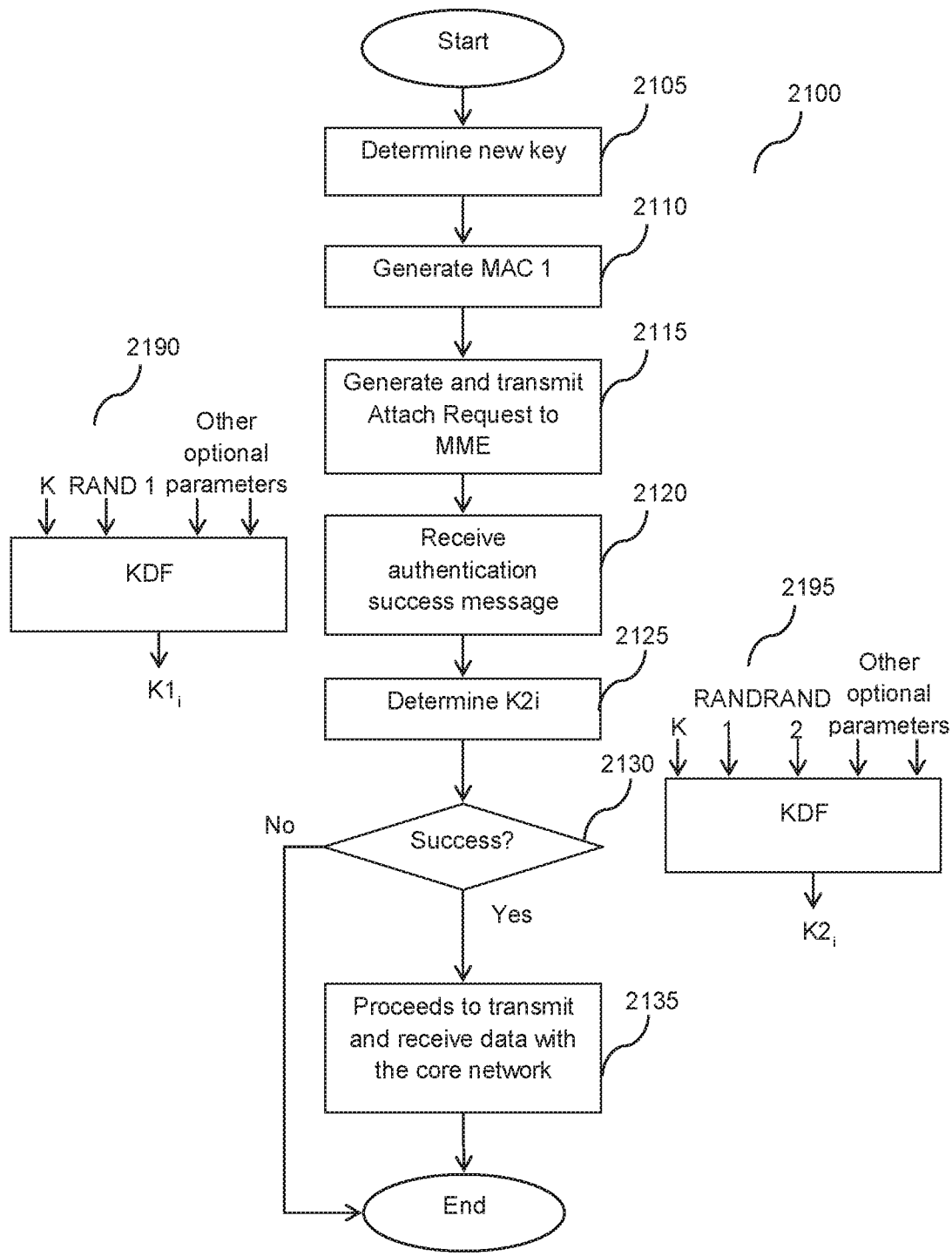
FIG. 21 illustrating a process flow performed by the device without SIM card according to the second mutual authentication process in accordance with an embodiment of this disclosure.

FIG. 21 illustrates a process flow 2100 performed by the IoT device in accordance with the second mutual authentication procedure of timing diagram 2000. Process 2100 begins with step 2105 by retrieving its Access IDi and Ki and determining a new key K1i using the key derivation function (KDF) 2190. The input parameters include Ki, a random number denoted as RAND 1, and other optional parameters.

In step 2110, the IoT device generates a Message Authentication Code for Integrity 1 (MAC 1) using K1i. The input parameters of MAC 1 include Access IDi, RAND 1, Fresh Parameter 1, and other parameters (optional) and can be expressed in the following manner, MAC 1=MAC K1i(Access ID||RAND 1||Fresh Parameter 1||Other Parameters (Optional))

In step 2115, the SDi generates and transmits an Attach Request to the MME. The Attach Request includes its Access IDi, RAND 1, Fresh Parameter 1, MAC 1, and other optional parameters. The fresh parameter can be timestamp, counter or sequence number (SQN) which can be used by the MME to verify the validity of the Attach Request.

In step 2120, the SDi receives an Authentication Success message from the MME. The Authentication Success message includes a one-bit sign to indicate that the authentication is success, RAND2, Fresh Parameter 2, other Parameters (Optional), and MAC 2.

In step 2125, the SDi determines K2i using the key derivation function (KDF) 2195. The input parameters include Ki, RAND 1, another random number denoted as RAND 2 and other optional parameters.

In step 2130, the SDi authenticates with the core network by verifying MAC 2 using K2i. In order to verify the MAC 2, the SDi generates the MAC for the received Authentication Success message using the same MAC generation function used by the MME with K2i. One example of the MAC generation function is keyed Hash Message Authentication Code (HMAC). If authentication is successful, process 2100 proceeds to 2135 and continue to transmit and receive data with the core network. Otherwise, process 2100 ends.

Figure 22:
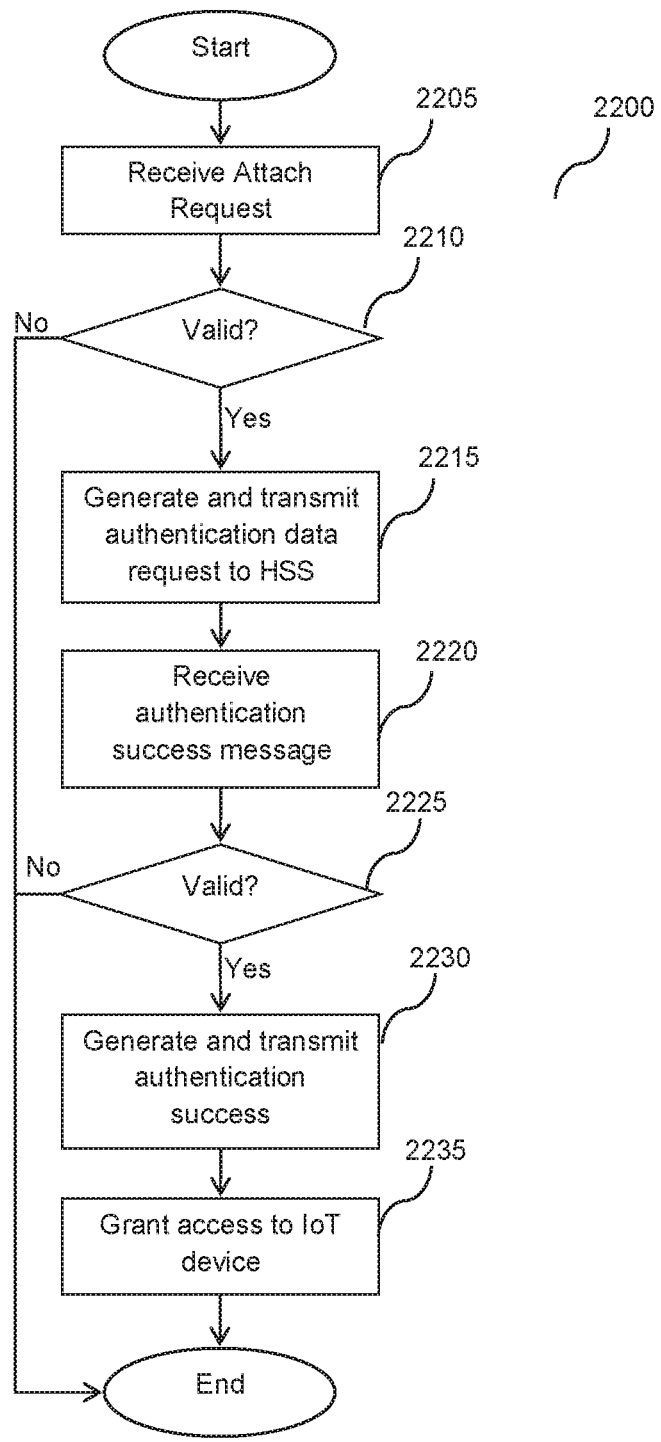
FIG. 22 illustrating a process flow performed by the MME in the core network according to the second mutual authentication process in accordance with an embodiment of this disclosure.

FIG. 22 illustrates a process flow 2200 performed by the MME in the core network in accordance with the second mutual authentication procedure of timing diagram 2000. Process 2200 begins with step 2205 by receiving the Attach Request.

In step 2210, the MME verifies the Fresh Parameter 1. This is to identify whether the authentication session is a replay attack. The fresh parameter can be timestamp, counter or sequence number (SQN). For example, if the fresh parameter is timestamp, the MME can verify whether the timestamp for the Attach Request is within an acceptable time range. If the timestamp is within an acceptable time range, the MME considers the Attach Request new and valid. If not, the MME considers the Attach Request as an out-dated message which could be a replay attack. If the fresh parameter is a counter, the MME can verify the counter is in running order with respect to the previous Attach Request. If the counter is in running order, the MME considers the Attach Request new and valid. If not, the MME considers the Attach Request as an out-dated message which could be a replay attack. If the fresh parameter is a SQN, the MME can verify the number of the Attach Request is in accordance with a pre-determined sequence with respect to the number in the previous Attach Request. If the counter is according to the pre-determined sequence, the MME considers the Attach Request new and valid. If not, the MME considers the Attach Request as an out-dated message which could be a replay attack. If the Fresh Parameter 1 is valid, process 2200 proceeds to step 2215. Otherwise, process 2200 ends.

In step 2215, the MME generates and transmits an Authentication Data Request to the HSS. The Authentication Data Request includes the Access Di and RAND 1.

In step 2220, the MME receives an Authentication Data Response from the HSS. The Authentication Data Response includes K1i, K2i, RAND 2, Control Parameters (Optional).

In step 2225, the MME authenticates SDi by verifying MAC 1 using K1i. In order to verify the MAC 1, the MME generates the MAC for the received Attach Request message using the same MAC generation function used by the SDi with K1i. One example of the MAC generation function is keyed Hash Message Authentication Code (HMAC). If the MAC 1 is valid, process 2200 proceeds to step 2230. Otherwise, process 2200 ends.

In step 2230, the MME generates and transmits an Authentication Success message to SDi. The Authentication Success message includes a one-bit sign to indicate that the authentication is success, RAND2, Fresh Parameter 2, other Parameters (Optional), and MAC 2. The MAC 2 is computed using K2i. The input parameters of computing MAC 2 include AuthSuccess, RAND 2, Fresh Parameter 2, and other parameters (optional) and can be expressed in the following manner, MAC 2=MAC K2i(AuthSuccess||RAND 2||Fresh Parameter 2||Other Parameters (Optional))

In step 2235, the MME grants access to the SDi. Particularly, the MME sends a message to the gateways to grant access to the SD. Process 2200 ends after step 2235.

Figure 23:
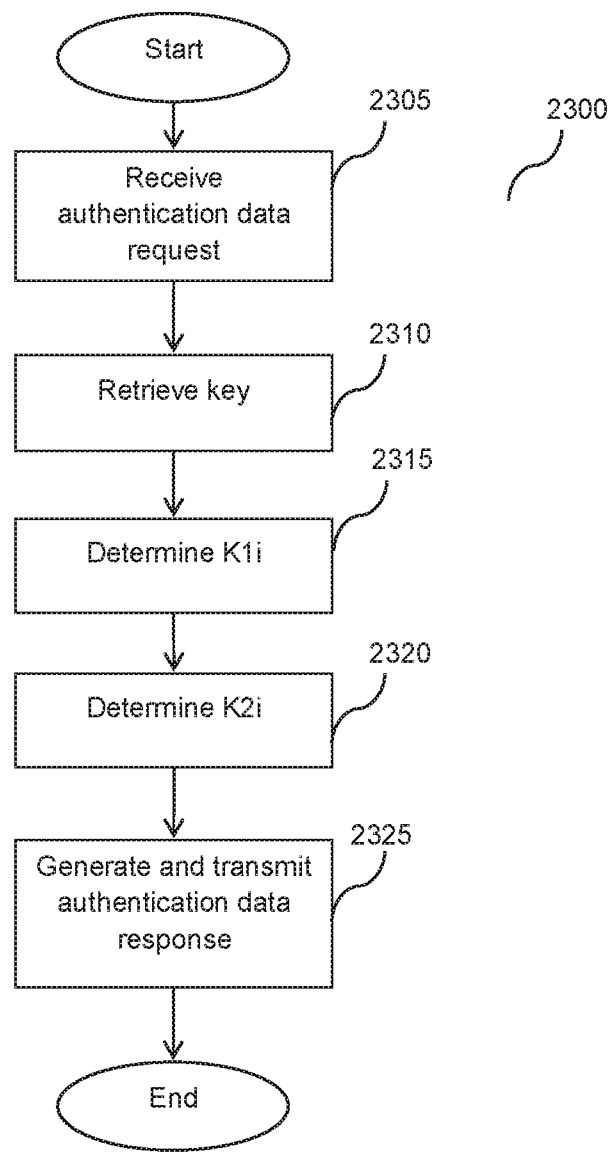
FIG. 23 illustrating a process flow performed by the HSS in the core network according to the second mutual authentication process in accordance with an embodiment of this disclosure.

FIG. 23 illustrates a process flow 2300 performed by the HSS in the core network in accordance with the second mutual authentication procedure of timing diagram 2000. Process 2300 begins with step 2305 by receiving the Authentication Data Request.

In step 2310, the HSS retrieves key Ki corresponding to the Access IDi.

In step 2315, the HSS first derives K1i using the KDF 2190 with Ki and RAND 1.

In step 2320, the HSS generates another random number RAND 2 and uses Ki, RAND 1, RAND 2 and other optional parameters to derive another key (K2i) using KDF 2195.

In step 2325, the HSS generates and transmits an Authentication Data Response to the MME. The Authentication Data Response includes K1i, K2i, RAND 2, Control Parameters (Optional).

Process 2300 ends after step 2325.

Similar to the second mutual authentication, a third mutual authentication between the IoT devices and core network is also based on the Access ID and the key. The timing diagram 2000 is also applicable to the third mutual authentication. However, there are some slight difference in how the data is being handled by the IoT devices, MME and HSS. Further details will be described below with reference to FIGS. 24-26.

Figure 24:
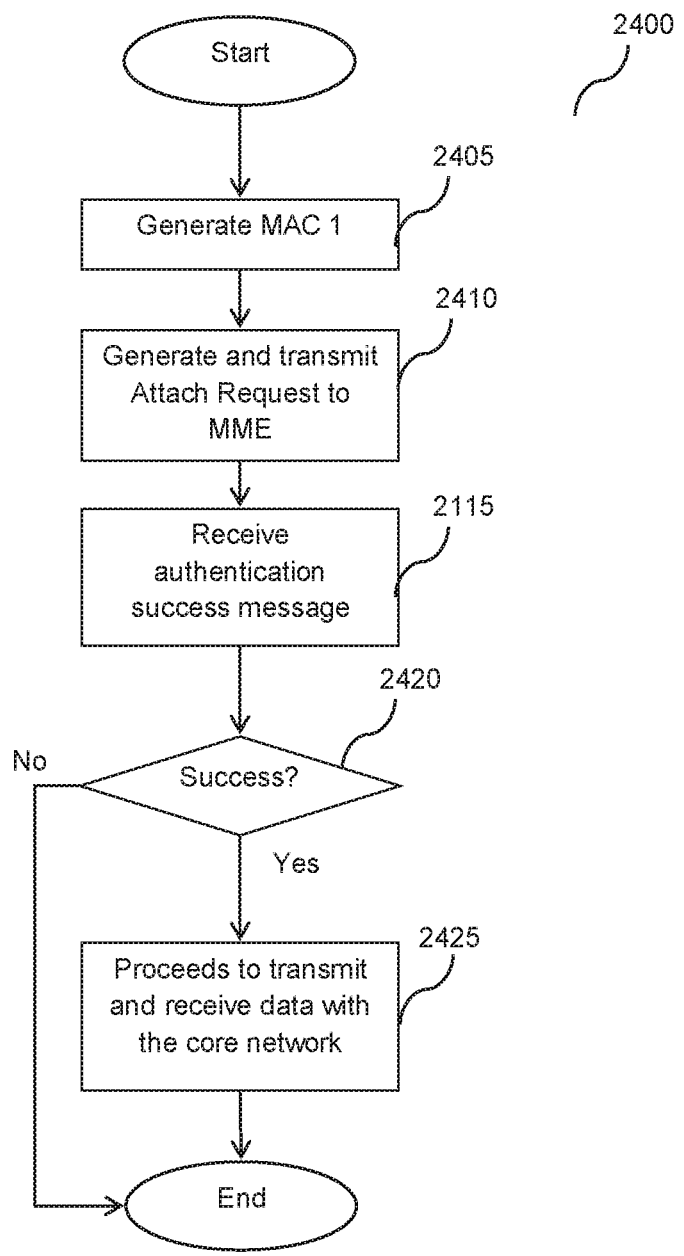
FIG. 24 illustrating a process flow performed by the device without SIM card according to the third mutual authentication process in accordance with an embodiment of this disclosure.

FIG. 24 illustrates a process flow 2400 performed by the IoT device in accordance with the third mutual authentication procedure. Process 2400 begins with step 2405 by generating MAC 1 using Ki. The input parameters of generating MAC 1 include the Access IDi of the IoT device, Fresh Parameter 1, and other parameters (optional) and can be expressed in the following manner, MAC 1=MAC Ki(Access IDi||Fresh Parameter 1||Other Parameters(Optional))

In step 2410, the SDi generates and transmits an Attach Request. The Attach Request includes the Access Di of the SDi, Fresh Parameter 1, MAC 1, and other optional parameters. The fresh parameter can be timestamp, counter or sequence number (SQN) which can be used by the MME to verify the validity of the Attach Request.

In step 2415, the SDi receives an Authentication Success message from the MME. The Authentication Success message includes a one-bit sign to indicate that the authentication is success, Fresh Parameter 2, other Parameters (Optional), and MAC 2.

In step 2420, the SDi authenticates with the core network by verifying MAC 2 using Ki. In order to verify the MAC 2, the SDi generates the MAC for the received Authentication Success message using the same MAC generation function used by the MME with Ki. One example of the MAC generation function is keyed Hash Message Authentication Code (HMAC). If authentication is successful, process 2400 proceeds to 2425 and continue to transmit and receive data with the core network. Otherwise, process 2400 ends.

Figure 25:
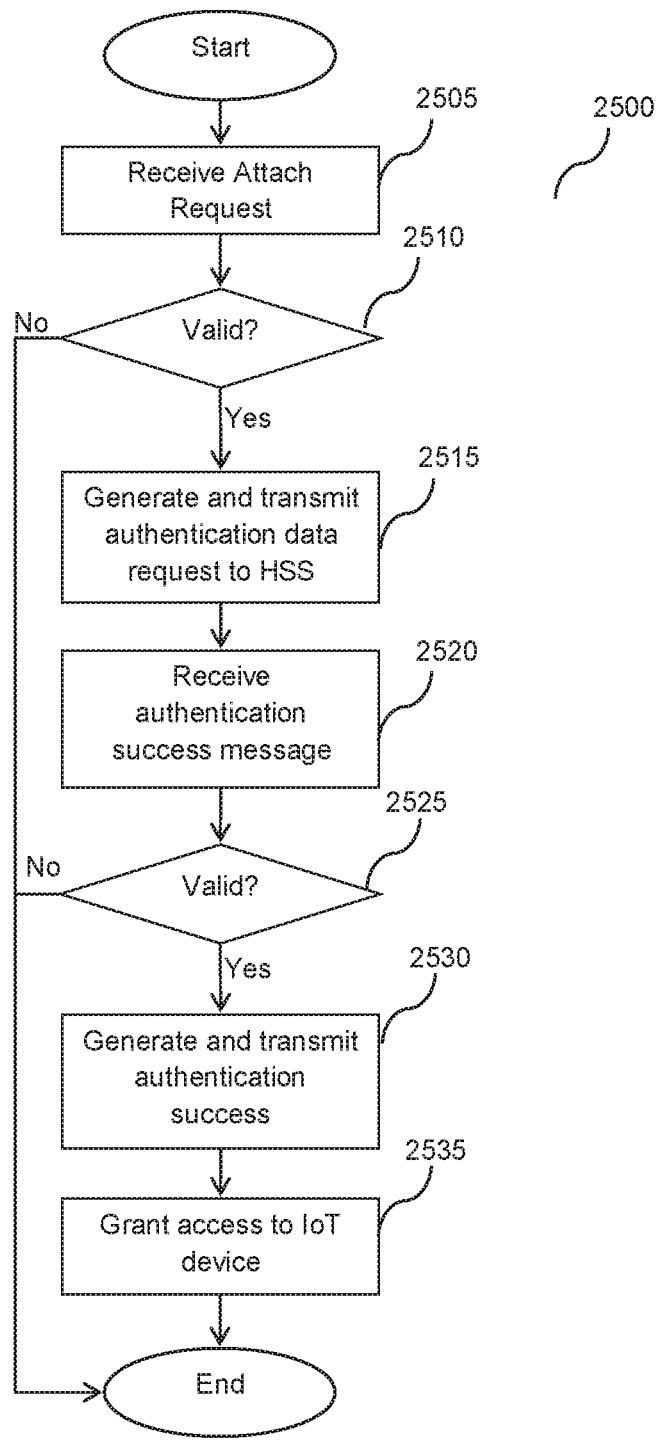
FIG. 25 illustrating a process flow performed by the MME in the core network according to the third mutual authentication process in accordance with an embodiment of this disclosure.

FIG. 25 illustrates a process flow 2500 performed by the MME in the core network in accordance with the third mutual authentication procedure. Process 2500 begins with step 2505 by receiving the Attach Request.

In step 2510, the MME verifies the Fresh Parameter 1. This is to identify whether the authentication session is a replay attack. Similar to step 2210 in process 2200, the verification of the validity of the Attach Request can be based timestamp, counter and/or sequence number (SQN). If the Fresh Parameter 1 is valid, process 2500 proceeds to step 2515. Otherwise, process 2500 ends.

In step 2515, the MME transmits an Authentication Data Request to the HSS. The Authentication Data Request includes the Access IDi.

In step 2520, the MME receives an Authentication Data Response from the HSS. The Authentication Data Response includes Ki and Control Parameters (Optional).

In step 2525, the MME authenticates SDi by verifying MAC 1 using Ki. In order to verify the MAC 1, the MME generates the MAC for the received Attach Request message using the same MAC generation function used by the SDi with Ki. One example of the MAC generation function is keyed Hash Message Authentication Code (HMAC). If the MAC 1 is valid, process 2500 proceeds to step 2530. Otherwise, process 2500 ends.

In step 2530, the MME generates and transmits an Authentication Success message to the SDi. The Authentication Success message includes a one-bit sign to indicate that the authentication is success, Fresh Parameter 2, other Parameters (Optional), and MAC 2. The MAC 2 is computed using Ki. The input parameters of computing MAC 2 include AuthSuccess, Fresh Parameter 2, and other parameters (optional) and can be expressed in the following manner, MAC 2=MAC Ki(AuthSuccess||Fresh Parameter 2||Other Parameters (Optional))

In step 2535, the MME grants access to the SDi. Particularly, the MME sends a message to the gateways to grant access to the SDi. Process 2500 ends after step 2535.

Figure 26:
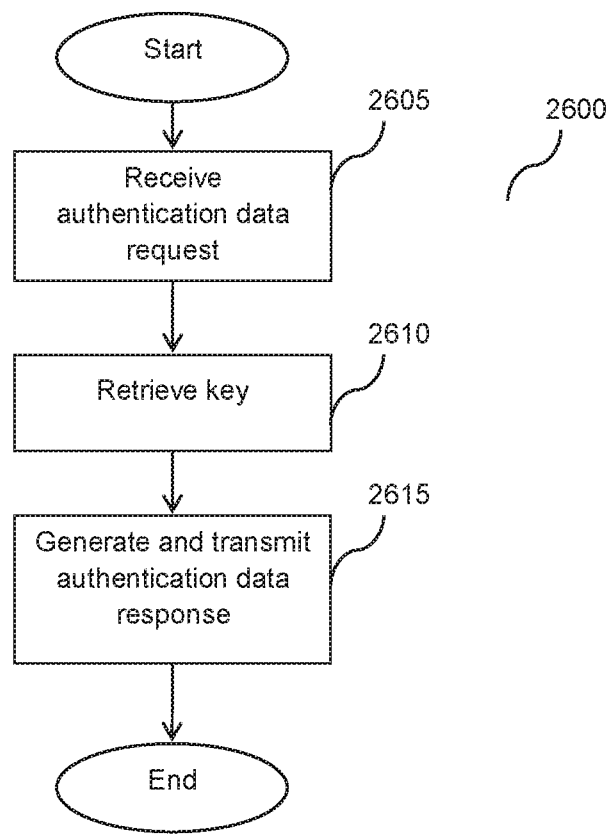
FIG. 26 illustrating a process flow performed by the HSS in the core network according to the third mutual authentication process in accordance with an embodiment of this disclosure.

FIG. 26 illustrates a process flow 2600 performed by the HSS in the core network in accordance with the third mutual authentication procedure. Process 2600 begins with step 2605 by receiving the Authentication Data Request.

In step 2610, the HSS retrieves key Ki corresponding to the Access IDi.

In step 2615, the HSS generates and transmits an Authentication Data Response to the MME. The Authentication Data Response includes Ki and Control Parameters (Optional). Process 2600 ends after step 2515.

It is noted that the IoT device communicate with the core network via either a MD or any networks that connects both IoT device and the core network. Hence, security channels between SD and MD, and between MD and core network are established in order for the IoT device to communicate with the core network. For brevity, the establishing of the security channels are omitted when discussing the first, second and third mutual authentications. Details of the establishment of the security channels are described above with reference to FIG. 5.

Revoke of Access $ID_i$

Access IDi can be revoked when necessary. Particularly, the Access Di can be revoked when the relevant SDi is compromised. The revoke of Access Di is allowed at any time after the Access IDi is created. To revoke the Access ID, the Master Device sends a Revoke Message to the core network within the security channel. The Revoke Message includes the Access IDi, and RevokeFlag. The RevokeFlag is a binary indicator, with either "0" or "1" representing the command to revoke the Access ID. Upon receiving the Revoke Message, the MME would transmit the Revoke Message to the HSS which will in turn deactivate the Access IDi.

Change of Control Parameters

Parameters can be changed or amended as and when required by the Master Device. For example, if the data usage for a SD1 is minimal while the SD2 is substantially more than SD1, the Master Device may want to adjust the parameters of both SD1 and SD2 so that the data usage limit for SD2 can be increased while the data usage limit for SD1 can be decreased.

The change of parameters is allowed at any time after the Access ID is created. To change the control parameters of SDi, Master Device sends the Parameters Change Message to the core network inside the security channel. The Parameters Change Message includes the Access IDi, Control Parameters, and Timestamp. The core network will manage the network access of SDs according to the Parameters with the latest Timestamp.

The processes described above for MME, HSS, and MD can be implemented to current MME, HSS and MD by way of a modification to existing processes. Alternatively, the process described above for MME, HSS, and MD can be implemented by way of a new communication protocol.

It is envisioned that embodiments of this disclosure can be applied to low-cost wireless devices without SIM but require access to the cellular network directly. Some examples of wireless devices without SIM are wearable devices such as smart watches and smart glasses and home consumer goods such as televisions, air-conditioners, refrigerators.

The above is a description of embodiments of a method and system of granting devices without SIM card to access the core network. It is foreseeable that those skilled in the art can and will design alternative method and system based on this disclosure that infringe upon this invention as set forth in the following claims.

What is claimed is:

1. A method for a master cellular device (MD) to register a secondary device without a SIM card (SD) to communicate directly with a core network comprising:
   establishing, by the MD, a first security channel between the MD and the SD;
   transmitting, by the MD, a request to the SD for an identity information of the SD (Device ID);
   based on transmitting the request to the SD, receiving, by the MD, the Device ID from the SD using the first security channel;
   generating, by the MD, an access ID and key (Ki) for the SD;
   in response to transmitting, by the MD and to the core network, the Device ID, the access ID, and the Ki, receiving, by the MD and from the core network, an acceptance message associated with the SD;
   based on the acceptance message associated with the SD, creating, by the MD, a new entry for the SD, wherein the new entry comprises the access ID and the Ki; and
   transmitting, by the MD, the access ID and Ki to the SD.

2. The method according to claim 1, wherein the generating the Access ID for the SD comprises:
   combining the MD's identity with Device ID to obtain the Access ID.

3. The method according to claim 1, wherein the generating the Access ID for the SD comprises:
   combining the MD's identity with a random number to obtain the Access ID.

4. The method according to claim 1, wherein the generating the Access ID for the SD comprises:
   combining a sequence number assigned to MD with the Device ID to obtain the Access ID.

5. The method according to claim 1, wherein the generating the key (K) for the SD comprises:
   generate $K_i$ using a Key Derivation Function (KDF) with an input parameter being one or more of MD's identity, Device ID and Access ID.

6. The method according to claim 1, wherein the MD is a cellular device comprising a SIM card, and wherein the SD is an Internet of Thing (IoT) device.

7. The method according to claim 1, wherein the method further comprises:
   establishing, by the MD, a second security channel between the MD and the core network, and
   wherein the transmitting, by the MD and to the core network, the Device ID, the access ID, and the Ki comprises transmitting the Device ID, the access ID, and the Ki using the second security channel.

8. The method according to claim 1, wherein the method further comprises:
   determining, by the MD, whether the Device ID of the SD is recorded in a database of the MD, and
   wherein the generating the access ID and the Ki for the SD is based on whether the Device ID of the SD is recorded in the database.

9. The method according to claim 1, wherein the new entry further comprises a control parameter associated with a pre-determined data limit for the SD.

10. A master cellular device (MD) for registering a secondary devices without a SIM card (SD) to communicate directly with a core network comprising:
    a processor; and
    a non-transitory computer-readable storage medium storing instructions that when executed by the processor cause the following steps to be performed:
      establishing a first security channel between the MD and the SD;
      transmitting a request to the SD for an identity information of the SD (Device ID);
      based on transmitting the request to the SD, receiving the Device ID from the SD using the first security channel;
      generating an access ID and key (Ki) for the SD;
      in response to transmitting the Device ID, the access ID, and the Ki to the core network, receiving, from the core network, an acceptance message associated with the SD;
      based on the acceptance message associated with the SD, creating a new entry for the SD, wherein the new entry comprises the access ID and the Ki; and
      transmitting the access ID and Ki to the SD.

11. The MD according to claim 10, wherein the instructions to generate the Access ID for the SD comprises instructions to:
    combine the MD's identity with Device ID to obtain the Access ID.

12. The MD according to claim 10, wherein the instruction to generate the Access ID for the SD comprises instructions to:
    combine the MD's identity with a random number to obtain the Access ID.

13. The MD according to claim 10, wherein the instruction to generate the Access ID for the SD comprises instructions to:
    combine a sequence number assigned to MD with the Device ID to obtain the Access ID.

14. The MD according to claim 10, wherein the instruction to generate the key ($K_i$) for the SD comprises instructions to:
    generate $K_i$ using a Key Derivation Function (KDF) with an input parameter being one or more of MD's identity, Device ID and Access ID.

15. A non-transitory computer-readable storage medium storing instructions that when executed by a processor cause the following steps to be performed:
    establishing a first security channel between the MD and the SD;
    transmitting a request to the SD for an identity information of the SD (Device ID);
    based on transmitting the request to the SD, receiving the Device ID from the SD using the first security channel;
    generating an access ID and key (Ki) for the SD;
    in response to transmitting the Device ID, the access ID, and the Ki to the core network, receiving, from the core network, an acceptance message associated with the SD;
    based on the acceptance message associated with the SD, creating a new entry for the SD, wherein the new entry comprises the access ID and the Ki; and
    transmitting the access ID and Ki to the SD.

16. The storage medium according to claim 15, wherein the instructions to generate the Access ID for the SD comprises instructions to:
    combine the MD's identity with Device ID to obtain the Access ID.

17. The storage medium according to claim 15, wherein the instruction to generate the Access ID for the SD comprises instructions to:
    combine the MD's identity with a random number to obtain the Access ID.

18. The storage medium according to claim 15, wherein the instruction to generate the Access ID for the SD comprises instructions to:
  combine a sequence number assigned to MD with the Device ID to obtain the Access ID.

* * * * *